United States Patent
Colando et al.

(10) Patent No.: US 7,593,755 B2
(45) Date of Patent: Sep. 22, 2009

(54) DISPLAY OF WIRELESS DATA

(75) Inventors: Christian J. Colando, Seattle, WA (US); Albert W. Tan, Redmond, WA (US); Dane M. Howard, Sammamish, WA (US); Lorenzo Tessiore, Redmond, WA (US); Eric Glenn Lang, Yarrow Point, WA (US)

(73) Assignee: Microsoft Corporation, Redmond, WA (US)

( * ) Notice: Subject to any disclaimer, the term of this patent is extended or adjusted under 35 U.S.C. 154(b) by 93 days.

(21) Appl. No.: 10/941,374

(22) Filed: Sep. 15, 2004

(65) Prior Publication Data
US 2006/0073851 A1 Apr. 6, 2006

(51) Int. Cl.
*H04M 1/00* (2006.01)
(52) U.S. Cl. ............... 455/566; 455/412.1; 455/412.2; 455/414.2; 455/414.3; 455/414.4; 455/145; 455/154.2; 455/158.4; 455/158.5
(58) Field of Classification Search ............... 455/412.1, 455/412.2, 414.2–414.4, 145, 154.2, 158.4, 455/158.5, 566
See application file for complete search history.

(56) References Cited

U.S. PATENT DOCUMENTS

| | | | |
|---|---|---|---|
| 2,824,218 A | 2/1958 | Gilliland | |
| 4,665,519 A | 5/1987 | Kirchner et al. | 370/94 |
| 4,761,796 A | 8/1988 | Dunn et al. | 375/1 |
| 5,046,066 A | 9/1991 | Messenger | 370/94.1 |
| 5,105,396 A | 4/1992 | Ganter et al. | 368/47 |
| 5,159,331 A * | 10/1992 | Park et al. | 340/7.44 |
| 5,266,945 A * | 11/1993 | Peek et al. | 340/7.33 |
| 5,297,118 A | 3/1994 | Sakumoto | 368/10 |
| 5,329,501 A * | 7/1994 | Meister et al. | 368/10 |
| 5,475,653 A * | 12/1995 | Yamada et al. | 368/10 |
| 5,479,378 A | 12/1995 | Yamada et al. | 368/10 |
| 5,528,559 A * | 6/1996 | Lucas | 368/10 |
| 5,572,488 A | 11/1996 | Yamada et al. | 368/10 |
| 5,757,782 A | 5/1998 | Gaskill | 370/313 |
| 5,854,985 A | 12/1998 | Sainton et al. | 455/553 |
| 5,877,744 A | 3/1999 | Gaskill | 345/146 |
| 5,928,322 A | 7/1999 | Bitar et al. | 709/4 |
| 5,974,034 A | 10/1999 | Chin et al. | 370/328 |

(Continued)

FOREIGN PATENT DOCUMENTS

EP 0 733 983 A2 9/1996

(Continued)

OTHER PUBLICATIONS

Ambient, "The Ambient Platform," Sep. 5, 2002, 2 pgs.

(Continued)

*Primary Examiner*—Patrick N Edouard
*Assistant Examiner*—Shantell Heiber
(74) *Attorney, Agent, or Firm*—Merchant & Gould; Ryan T. Grace

(57) ABSTRACT

A mobile electronic device for receiving and displaying information from a wireless signal transmission is provided. The device utilizes one or more mechanical and/or digital indicators for displaying the information. One embodiment of the invention provides a smart personal object, such as a watch device, for receiving and displaying wireless transmission information, wherein the object has a traditional style and look. The device is operable to convey received information using hands, sliders, dials, rings, disks, etc. and can be constructed in traditional high fidelity/quality.

15 Claims, 16 Drawing Sheets

U.S. PATENT DOCUMENTS

| | | | |
|---|---|---|---|
| 6,012,159 A | 1/2000 | Fischer et al. | 714/755 |
| 6,028,933 A | 2/2000 | Heer et al. | 713/169 |
| 6,084,828 A | 7/2000 | Bland et al. | 368/80 |
| 6,111,896 A | 8/2000 | Slattery et al. | 370/535 |
| 6,175,729 B1* | 1/2001 | He et al. | 455/344 |
| 6,195,538 B1* | 2/2001 | Owaki | 455/158.4 |
| 6,211,860 B1* | 4/2001 | Bunsen | 345/157 |
| 6,212,414 B1 | 4/2001 | Alameh et al. | 455/575 |
| 6,282,435 B1* | 8/2001 | Wagner et al. | 455/566 |
| 6,567,416 B1 | 5/2003 | Chuah | 370/418 |
| 6,580,664 B2* | 6/2003 | Magnusson | 368/47 |
| 6,590,588 B2 | 7/2003 | Lincke et al. | 715/744 |
| 6,617,964 B1 | 9/2003 | Lamb | 340/286.02 |
| 6,628,629 B1 | 9/2003 | Jorgensen | 370/322 |
| 6,694,316 B1 | 2/2004 | Langseth et al. | 707/10 |
| 6,738,634 B1 | 5/2004 | Shin | 455/466 |
| 6,751,164 B1* | 6/2004 | Sekiguchi | 368/80 |
| 6,762,728 B2* | 7/2004 | Koyama et al. | 343/718 |
| 6,967,903 B2* | 11/2005 | Guanter | 368/224 |
| 7,130,313 B2 | 10/2006 | Pekonen | 370/473 |
| 2001/0032254 A1 | 10/2001 | Hawkins | 709/219 |
| 2003/0154492 A1 | 8/2003 | Falvo et al. | 725/113 |
| 2003/0202517 A1 | 10/2003 | Kobayakawa et al. | 370/395.4 |
| 2004/0037291 A1 | 2/2004 | Attar et al. | 370/395.4 |
| 2004/0042459 A1 | 3/2004 | Chen et al. | 370/395.4 |
| 2004/0047244 A1 | 3/2004 | Iino et al. | 368/276 |
| 2004/0120319 A1 | 6/2004 | Asawa et al. | 370/395.4 |
| 2005/0066037 A1 | 3/2005 | Song et al. | 709/227 |
| 2006/0007871 A1 | 1/2006 | Wellin | 370/252 |
| 2006/0171362 A1 | 8/2006 | Garg et al. | 370/338 |

FOREIGN PATENT DOCUMENTS

| | | |
|---|---|---|
| WO | WO 99/12109 | 3/1999 |
| WO | WO 00/28680 | 3/2000 |
| WO | WO 02/15607 A2 | 2/2002 |
| WO | WO 02/15607 A3 | 2/2002 |

OTHER PUBLICATIONS

Office Action mailed Dec. 11, 2007, U.S. Appl. No. 10/336,240, filed Jan. 3, 2003, entitled "Frame Protocol and Scheduling System".

Office Action mailed Apr. 6, 2007, U.S. Appl. No. 10/336,240, filed Jan. 3, 2003, entitled "Frame Protocol and Scheduling System".

Gasgill et al., "High Speed Subcarrier Data System (HSDS)," *Seiko Communications*, Sep. 21, 1993, 14 pgs.

Sinclair, "The FM Wristwatch Radio," last updated Jan. 7, 1997 1 pg.

LTJ Designs, "Sinclair Watch Radio," last updated Jun. 6, 2000, 4 pgs.

Ambient, "Ambient Devices," Sep. 5, 2002, 3 pgs.

Office Action mailed Jun. 16, 2006, U.S. Appl. No. 10/336,228, filed Jan. 3, 2003, entitled "Glanceable Information and System and Method".

\* cited by examiner

DISPLAY OF WIRELESS DATA

CROSS-REFERENCE TO RELATED APPLICATIONS

This application is related to U.S. patent application Ser. No. 10/336,228, entitled "Glanceable Information System and Method" which was filed on Jan. 3, 2003, and U.S. patent application Ser. No. 10/336,240, entitled "Frame Protocol And Scheduling System" which was filed on Jan. 3, 2003, both of which are expressly incorporated herein by reference.

FIELD OF THE INVENTION

The present invention relates generally to portable electronic devices. More particularly, the present invention relates to a device and method for collecting and displaying wireless data.

BACKGROUND OF THE INVENTION

As society becomes increasingly mobile, mobile electronic devices are enjoying a tidal wave of popularity and growth. Cell phones, wireless PDAs, wireless laptops and other mobile communication devices are making impressive inroads with mainstream customers. Constraining this growth and limiting customer satisfaction, however, is the lack of a truly adequate high-coverage-area, inexpensive, small, battery-efficient wireless communication system. Cellular data-transmit telephony-based solutions are far from power-efficient, and impose (relative) cost and size burdens that make them unusable.

A range of new technologies including low-distraction user interfaces, a new operating system platform, and new communications capabilities are being developed. Smart Personal Objects are everyday objects, such as clocks, pens, keychains and billfolds, that are made smarter, more personalized and more useful through the use of special software. These everyday objects already exist in huge numbers, and, of course, all of them already have primary functions that people find valuable. They could also be extended to display not just time, but timely information—traffic information, schedule updates, news—anything that is time-critical and useful to people.

The ability of these objects utilize the information is partially dependent upon the display capability of each object. These objects typically utilize a digital display for displaying the received information. Unfortunately, many potential customers are hesitant to purchase these objects, partially basing their purchasing decision on the inelegant digital display. That is, many potential customers are unwilling to wear digital watches or require/prefer a more elegant or fashionable watch.

SUMMARY OF THE INVENTION

A battery-powered, portable computer, such as watch device, is provided for receiving wireless transmissions and displaying information based at least in part on information contained in the wireless transmissions. The invention provides a device which allows device manufacturers a high degree of customization to display smart personal object data, thereby catering to higher-end brands and the related consumer base.

In one embodiment, the device receives and processes information from a wireless transmission. The device includes one or more mechanical indicators for displaying the information received via the wireless transmission. In another embodiment, the device operates to display information using a mechanical indicators or some combination of digital and mechanical indicators. Various mechanical indicators may be used for conveying the information to a user such as hands, sliders, dials, rings, disks, etc. for example. Alternatively, information may be conveyed using various mechanical indicators coupled with one or more digital displays (i.e. LEDs, LCDs, etc.). By using mechanical indicators to convey information, the device can be constructed in traditional high fidelity/quality. In certain embodiments, devices may be wrist-worn watches specially configured to receive transmissions from broadcast towers, or other signal transmission systems/devices. Thus, according to the invention, a device, such as a watch device, having a more elegant style and look, may display information received from a wireless transmission.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

Figure 1:
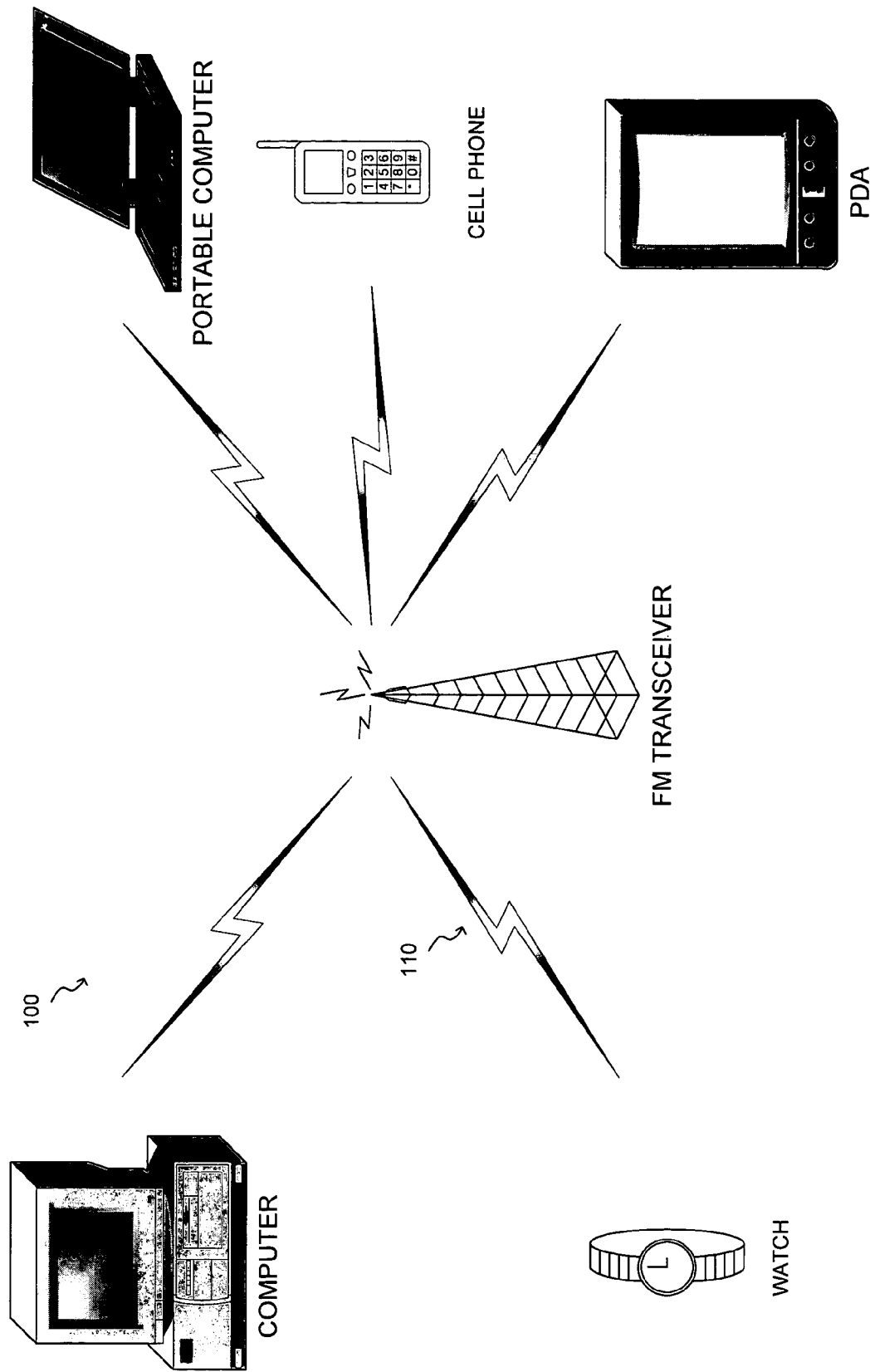
FIG. 1 is a diagram illustrating an operating environment.

The present invention is described in the context of a wireless communication device for receiving and displaying information. In the described embodiments, the devices may be watch type devices that are specially configured to receive communication signals, as is described in greater detail below. As will become apparent from a reading of the following detailed description, the devices display information using mechanical elements or mechanical elements coupled with digital indicators, based at least in part upon received wireless signals transmitted from a source. Minor deviations from the described embodiments will also become apparent without departing from the spirit of the invention.

Although described here in the context of a watch-based system, it will be apparent that the teachings of the application have equal applicability to any other mobile or non-mobile devices, such as portable and desktop computers, personal digital assistants (PDAs), cellular telephones, clocks, etc. The use of a watch is for illustrative purposes only to simplify the following discussion, and may be used interchangeably with "mobile device."

"Computer readable media" can be any available media that can be accessed by client/server devices. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are included within the scope of computer readable media.

The term "content" can be any information that may be stored in an electronic device. By way of example, and not limitation, content may comprise graphical information, textual information, and any combination of graphical and textual information. Content may be displayable information or auditory information. Auditory information may comprise a single sound or a stream of sounds.

The overall operating environment for the present invention will be discussed as follows below with reference to FIGS. 1-2.

Operating Environment

FIG. 1 illustrates an example operating environment 100 for the present invention. As illustrated in the figure, an FM signal or broadcast is transmitted over a communication channel 110 to various electronic devices. Example electronic devices that have an FM receiver or transceiver may include a desktop computer, a watch, a portable computer, a wireless cellular telephone (cell phone), and/or a personal data assistant (PDA). The electronic devices are arranged to receive information from the FM broadcast. The FM broadcast may be of any number of types including but not limited to: a standard FM transmission, a sub-carrier FM transmission, or any other type of FM transmission as may be desired.

Example electronic devices that may include an electronic system that is arranged to operate according to the interaction model are illustrated in FIG. 1. The electronic system may employ a wireless interface such as the FM transmission systems that are described above. Each of the electronic systems receives messages/information over the communication channel.

Each broadcast transmission corresponds to the transmission of one or more frames. Each frame may include multiple messages, where some messages are public broadcast (aka "global" or "shared" messages), while other messages are client specific messages (aka "personal" or "private" messages). Every client that is located within the designated service region may receive shared messages, while a single client may decode a private message.

Electronic devices (e.g., a wireless watch device) receive message packets according to shared and private messages that are directed to the client device. Message packets are organized in groups according to logical slot (or channel) entry numbers. For example, a particular electronic device is configured to receive a selected group of channels from the available channels. The message packets associated with each of those channels is received, processed, and stored in the client device. The stored message packets can be reviewed using a user interface that employs an interaction model, in accordance with the present invention.

Example channels include: a time channel, a messages channel, a contact channel, a calendar channel, a weather channel, a stocks channel, a news channel, sports, and/or a games channel. Messages associated with each channel include message content that is based on the particulars of the channel. For example, the weather channel may include the current weather in a local region, the current weather in a national region, and the current weather in an international region.

The operating environment shown and described provides examples of suitable operating environments and are not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Illustrative Electronic System

Figure 2:
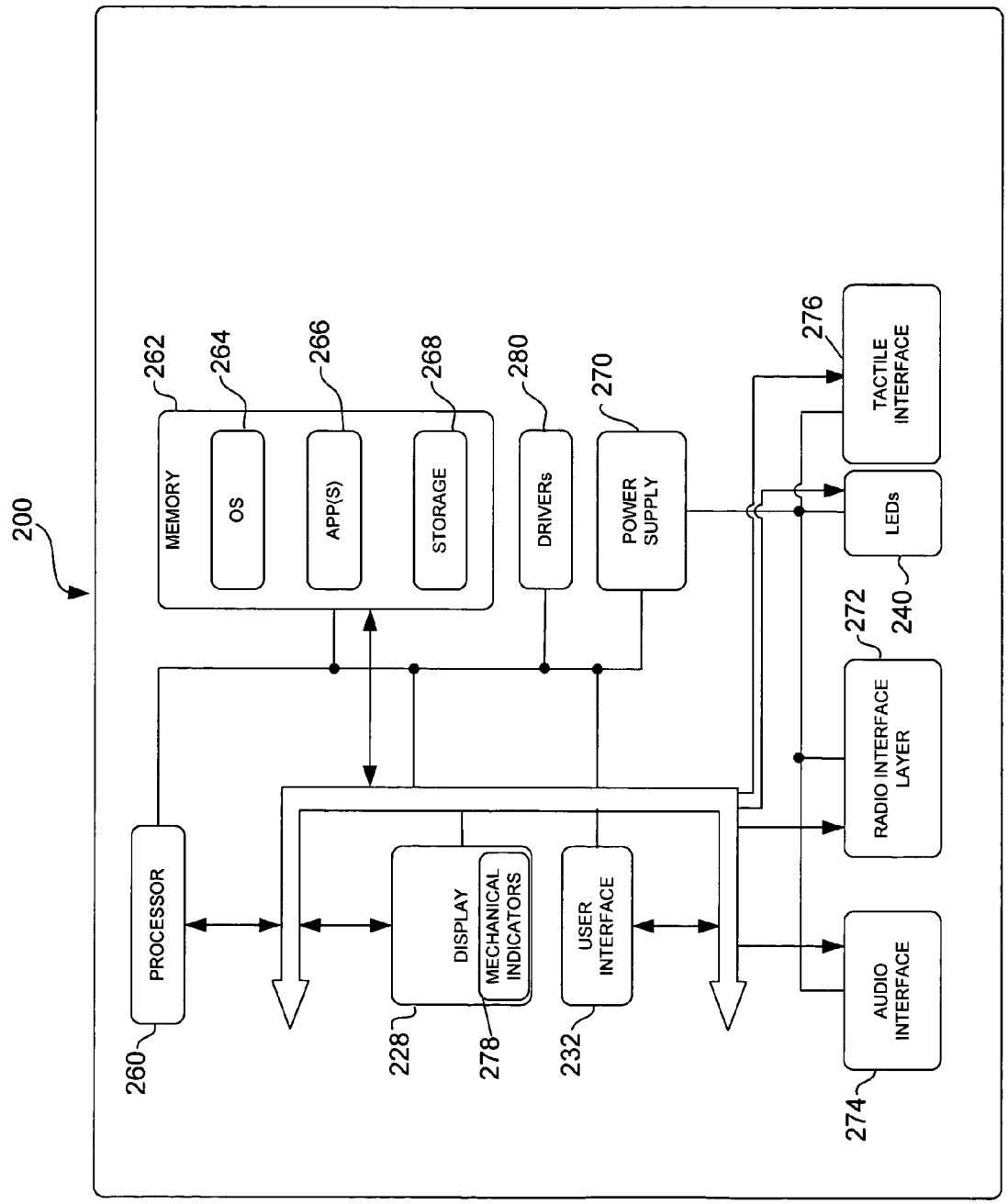
FIG. 2 is a schematic diagram illustrating an electronic device.

FIG. 2 is a schematic diagram illustrating functional components of an illustrative electronic device 200. The electronic device 200 has a processor 260, a memory 262, a display 228, and a user interface 232. The memory 262 generally includes both volatile memory (e.g., RAM) and non-volatile memory (e.g., ROM, Flash Memory, or the like). The electronic device 200 includes an operating system 264, such as the Windows CE operating system from Microsoft Corporation or another operating system, which is resident in the memory 262 and executes on the processor 260. The user interface 232 may be a series of push buttons, a scroll wheel, a numeric dialing pad (such as on a typical telephone), or another type of user interface means. The display 228 may be a liquid crystal display, a multiple bit display, a mechanical display, a hybrid display, or a full color display or any other type of display commonly used in electronic devices. In one example, the display 228 may be touch-sensitive that would act as an input device.

One or more application programs 266 are loaded into memory 262 and run on the operating system 264. Examples of application programs include phone dialer programs, email programs, scheduling/calendaring programs, PIM (personal information management) programs, Internet browser programs, and so forth. The electronic device 200 also includes a non-volatile storage 268 that is located within the memory 262. The non-volatile storage 268 may be used to store persistent information which should not be lost if the electronic device 200 is powered down. The applications 266 may use and store information in the storage 268, such as e-mail or other messages used by an e-mail application, contact information used by a PIM, appointment information used by a scheduling program, documents used by a word processing application, and the like.

The electronic device 200 has a power supply 270, which may be implemented as one or more batteries. The power supply 270 might further include an external power source, such as an AC adapter or a powered docking cradle that supplements or recharges the batteries.

The electronic device 200 is also shown with various types of external notification mechanisms: one or more light-emitting diodes (LEDs) 240, an audio interface 274, a tactile interface 276, and one or more mechanical elements 278 included as part of the display 228. These devices may be directly coupled to the power supply 270 so that when activated, they remain on for a duration dictated by the notification mechanism even though the processor 260 and other components might shut down to conserve battery power. The LEDs 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation, or as a user interface using voice recognition. In another example, as described further below, a vibration device (tactile interface 276) can be used to give feedback to the user such as for alerting the user of a newly arrived message and/or other information. The electronic device 200 may control each alert mechanism separately (e.g., audio, vibration, as well as visual cues).

The electronic device 200 also includes a radio interface layer 272 that performs the function of receiving and/or transmitting radio frequency communications. The radio interface layer 272 facilitates wireless connectivity between the electronic device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa (described below).

Figure 3A:
FIG. 3A depicts a watch device according to an embodiment of the invention.
Figure 3B:
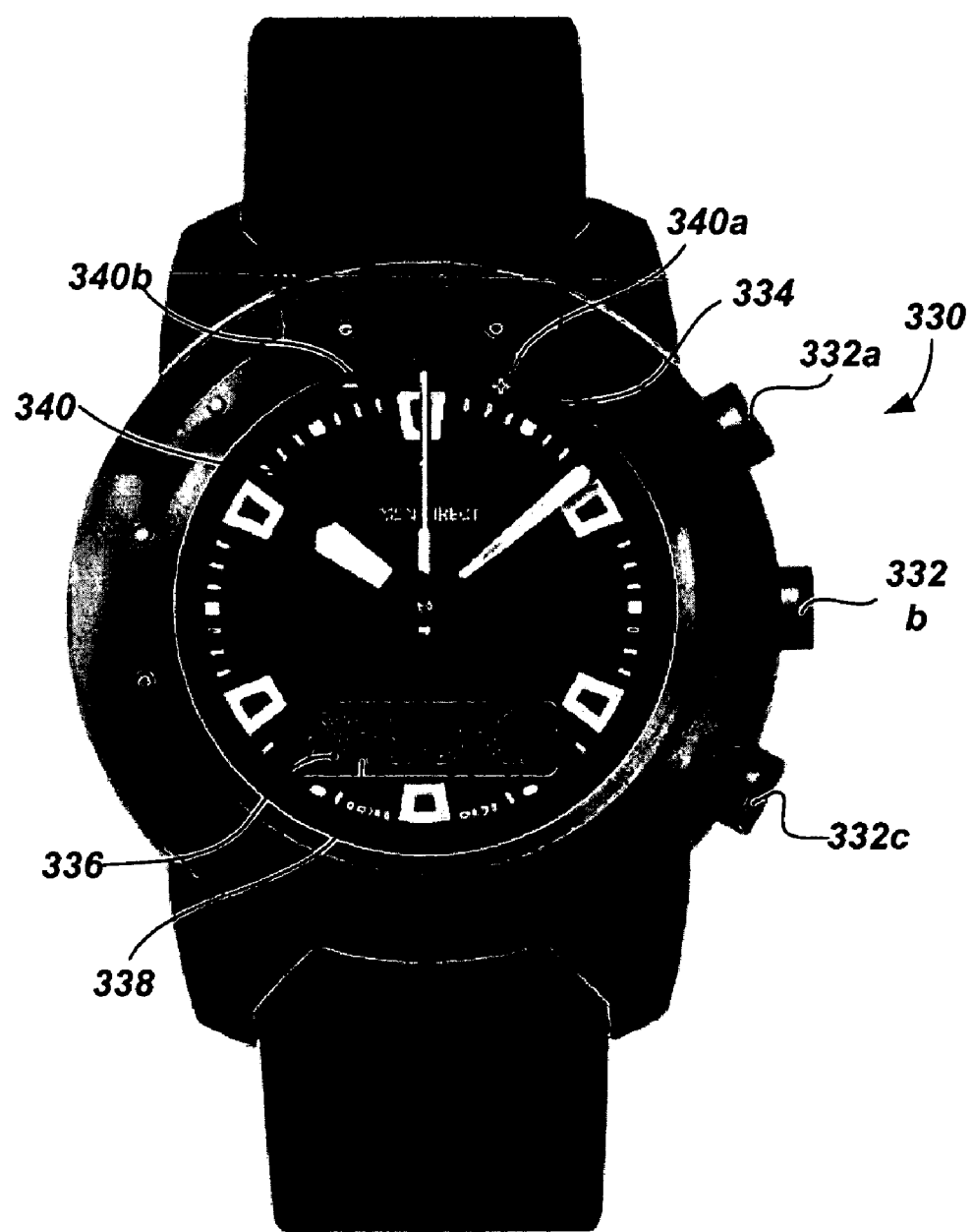
FIG. 3B depicts a watch device according to another embodiment of the invention.

In one example of the present invention, electronic device 200 is a mobile electronic device such as a watch device that includes a wireless interface. Exemplary user interfaces for a watch device are shown in FIGS. 3A and 3B, as will be described below. Although the below-described user interface configurations include multiple selector buttons (e.g., four selector buttons), the functions of many of the selector buttons may be combined by a single selector (e.g., a button, a rocket switch, a wheel, etc.).

User Interfaces (UI)

FIG. 3A illustrates an exemplary watch device 300 that includes a user interface to an electronic system that is configured to operate in accordance with the present invention. The watch device 300 includes a bezel 302, which has an electronic system (e.g., see FIG. 2 and FIG. 4 below). The bezel 302 has an analog and/or digital display 304. The bezel includes analog-type watch hands 306a-c for tracking hours, minutes, and seconds. In alternative embodiments, the watch hands may be used to track or draw attention to other information.

The watch device 300 includes a series of selectors 308a-c that are arranged to operate as a user interface (UI). Selector 308c operates according to both translational and rotational movement, allowing multiple functions to be performed, as described further below. Each selector may be implemented to have default function, and/or a context determined function. The currently selected channel determines the context for each selector. The electronic watch device 300 is context sensitive in that the function that is associated with each selector may change based on the selected channel or display screen.

A first one of the selectors 308a may control a first analog and/or digital display 310. In FIG. 3A, the display 310 is an analog display. As used herein, "analog display" refers to indicating information using mechanical indicators. The analog display of FIG. 3A includes a gradated area having a plurality of "tick" marks, including "positive" and "negative" indicators. Each tick mark may be used to indicate a greater or lesser quantity, status, or amount. The analog display further includes a pointer 312 for pointing to a tick mark, based on the wireless information received and processed by the device 300. In a similar fashion, a second one for the selectors 308b may control a second analog and/or digital display 314. For this example, display 314 is a digital display, depicting a stock indicator as the selected current channel. As will be described below, the device 300 includes a variety of current channel indicators which can be displayed on the digital display 314. FIG. 3A depicts that a stock channel is the current channel, wherein no change has occurred heretofore based on the "zero" indication of the analog display 310. A positive change in the stock channel, such as NASDAQ for example, is indicated when the pointer 312 is pointing to the positive side of the analog display. A negative change in the stock channel, is indicated when the pointer 312 is pointing to the negative side of the analog display.

As one example, activation of selector 308a can reset the display to a default setting. Alternatively, activating selector 308a may page up from a current displayed event/category to a previous event/category. The resetting of the display 310 may be accomplished by activating the first selector for a predetermined time period. For example, when the selector is a button as shown in FIG. 3A, the button is held for a timeout interval such as two seconds before the setting function is activated. Alternatively, activating selector 308b may page down from a current displayed event/category to a next event/category. A backlighting function may be utilized when both selectors 308a-b are simultaneously depressed for a predetermined interval.

For the embodiment shown in FIG. 3A, a third one of the selectors 308c is to control various aspects of the device including controlling the analog hands 306a-c. The third selector may be retracted from the bezel to a plurality of positions. At each position, the third selector may be rotated clockwise or counter-clockwise to control certain functions. One of the third selector positional states may also operate to control one or more analog/digital displays. That is, the third selector may be configured as a "master" selector, operable to control all functional aspects of the watch device 300. The third selector 308c may also have an alternate function based on the currently selected channel (a stock channel, for example) or display. In one example, the third selector is activated by retracting the selector to a first position with respect to the bezel and rotating the selector in a clockwise manner for a predetermined time interval (e.g., two seconds)

to select a main channel or "primary" channel (a stock channel, for this example). The selectors are arranged such that the electronic device accomplishes navigating and selecting content on a channel in a simple manner.

Selectors 308*a*-*c* may also be replaced with a wheel type of device. The functions of the selectors may be activated by rotating the wheel device in a counterclockwise and/or clockwise manner and/or by pressing the wheel device towards the watch bezel. It will be appreciated that other examples of selector mechanisms may be employed and the present invention is not intended to be limited to any specific examples/embodiments described herein.

Displaying Wireless Data

According to the present invention, a device is provided for receiving and processing a wireless signal, preferably a radio signal, transmitted by a source. The device is operable to display various information extracted from the wireless signal. The device is operable to receive "real-time" information, such as stock, sports, weather, and other information and to display the information using, in part or solely, analog (mechanical) indicator mechanisms. The invention provides a solution for consumers who are unwilling to use or wear wireless electronic devices due to inelegant or undesirable display characteristics of the devices. For example, certain watch consumers will not wear watches that do not have certain user-oriented characteristics, such as quartz displays, chronograph features, perpetual calendars, kinetic winding, etc. Other users are dissatisfied with the rather inelegant digital displays associated with many electronic watch and other products. The present invention provides solutions to these and other problems associated with consumer satisfaction and preference. However, it will be appreciated that the present invention is not limited to watch devices, and those skilled in the art will realize the benefits of the present invention for other mobile electronic devices.

Figure 4A:
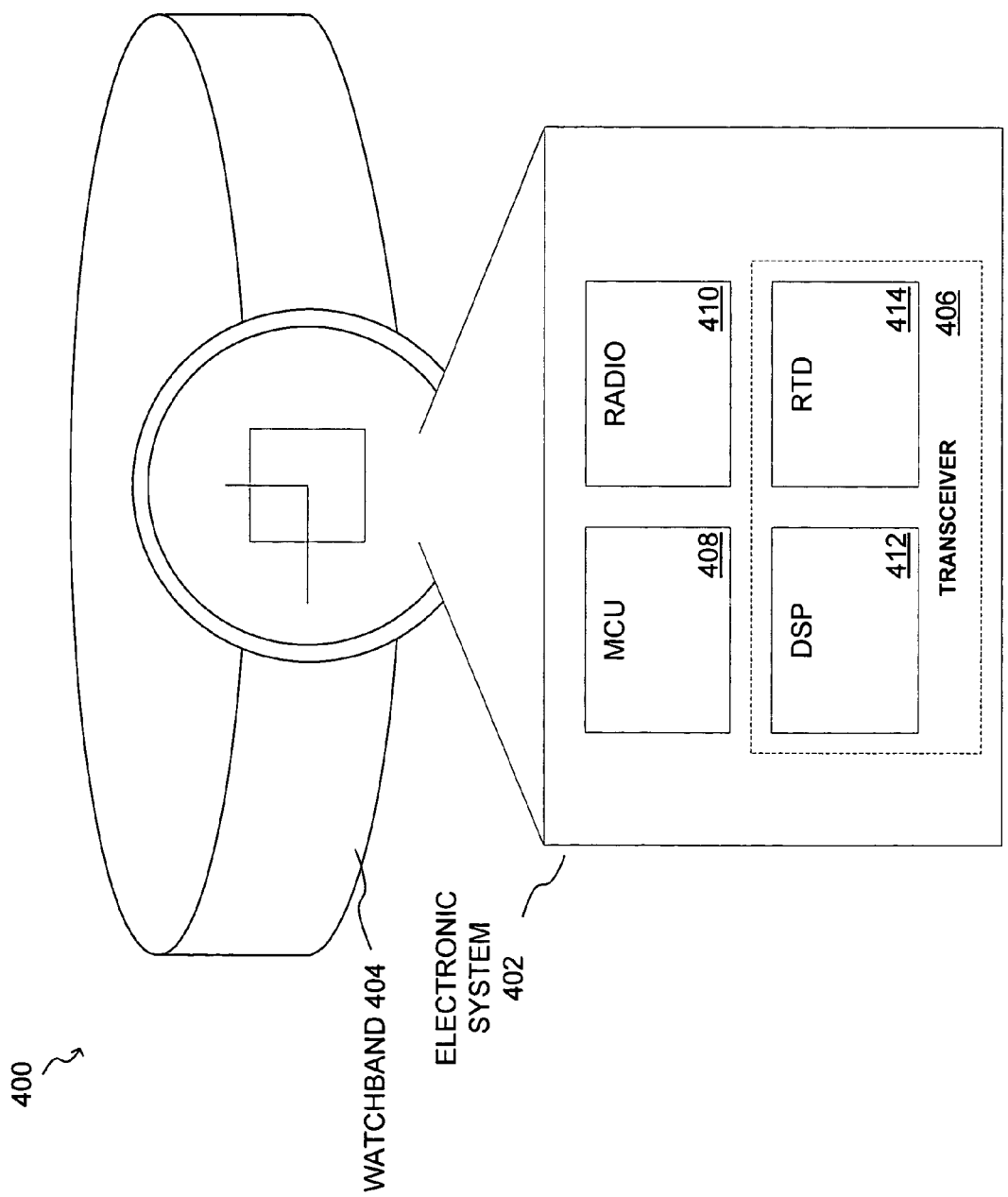
FIG. 4A is a diagram illustrating a watch device and related components.

In addition to the watch devices described above, yet another exemplary watch device 400 is shown in FIG. 4A. The watch device 400 includes an electronic system 402 that is configured to operate in accordance with the present invention. The watch device 400 includes a watchband 404 that includes an antenna that is either attached to the watchband or integrally formed within the watchband 404. The antenna is coupled to the electronic system 402 contained in the watch. The electronic system 402 may be contained in the bezel as shown in FIG. 4A, or in some other portion of the watch device.

The electronic system 402 is a computer-based system, including functionality of operating as either a receiver and/or transceiver type of device. As illustrated in the figure, the electronic system includes a transceiver 406, a microcomputer unit or microprocessor 408, and an analog radio 410. The antenna connects to, and is controlled by, the transceiver 406. Transactions between the microprocessor 408 and the radio components are mediated over a microprocessor-digital transceiver interface. The components of the watch device 400 are housed in a watch-sized enclosure and rely on battery power for operation.

The transceiver 406 generally includes a digital signal processor (DSP) 412, which performs control, scheduling, and post-processing tasks for the transceiver, and a real-time device (RTD) 414, which includes a digital radio, system timing, and real-time event dispatching. The DSP 412 is coupled to the microprocessor 408, and transceiver tasks are commanded by the microprocessor 408.

One of the DSP's tasks may process received data for such purposes as sub-carrier phase recovery, baud recovery and/or tracking, compensation for fading effects, demodulation, de-interleaving, channel state estimation and error-correction. The post-processing of packets may occur when an entire packet has been received, or another subsequent time. The DSP 412 analyzes the transmitted data packets to determine a broadcast station's signal timing with respect to a local clock of the RTD 414. The local clock is synchronized with the transmitter's clock signal to maintain signal sampling integrity. The receiver is periodically brought into symbol synchronization with the transmitter to minimize misreading of the received data.

The digital section of the RTD 414 may include system time-base generators, such as a crystal oscillator that provides a system clock for the microprocessor 408 and the DSP 412. The time-base also provides baud and sample timing for transmit and receive operations, start/stop control for radio operation, and controls the periods of clock suspension, when required. The RTD 414 also performs radio operations, and may perform additional operations as well. The radio 410 is arranged to receive segments of data that is arranged in packets.

As described above, the user interface is configured as a means for selecting one or more services. In one example, a wireless client device user interacts with the user interface to select services such as news, stock prices, weather, and other features such as a personal calendar, address book, and the like. Selected services are entered in a database for broadcast transmission at a later time. At the designated time (or time interval) the scheduling interface communicates with the broadcast server to begin a transmission sequence of data for the selected services. The broadcast server subsequently formats the data for reception by one or more wireless client device, queues the data for transmission, and communicates the queued data to the FM broadcast tower for transmission. In an alternative example, the scheduling interface communicates the selected services to the broadcast server. The broadcast server schedules the time interval for transmission of the selected service.

Each broadcast transmission corresponds to the transmission of one or more frames that are arranged in accordance with a frame protocol. Each frame may include multiple messages, where some messages are public broadcast (aka "global" or "shared" messages), while other messages are client specific messages (aka "personal" or "private" messages). Each frame includes a table of contents that indicates the extent of messages that are found within the next transmitted frame. Every client that is located within the designated service region may receive shared messages, while a single client may decode a private message.

Each frame includes a header, a table of contents, and a message payload that includes the content for one or more selected services as previously described. The header also includes other information such as authentication data, identified service region, language, available stations for the identified service region, frame number, and time stamp. Control information may also be included in one of the headers to indicate broadcast conditions such as a change in available channels, an assignment of a service region to a particular wireless client device, and an assignment of a particular channel (frequency). In one example, each frame includes a change counter in one of the headers to indicate a change has taken place in the system. Wireless client devices (clients) may use the change counter to determine when to initiate a failover (when a broadcast tower becomes unavailable).

Client devices may be organized in a series of layers that are similar to the OSI networking model. The layers include a physical layer, a link layer, a network layer, a transport layer, and an application layer. The physical layer receives the FM subcarrier transmitted information and provides symbols to the link layer. The link layer divides the symbols into segments, and handles viterbi coding, data whitening, and interleaving functions. The network layer receives the segments and creates logical packets. The network layer also handles cyclic redundancy check (CRC), encryption, and Reed-Solomon coding. The transport layer decodes the logical packets to retrieve a table of contents (TOC), and includes data handlers that handle communication to the application layer. The application layer includes a series of applications that are resident on the client device, and associated with subscriptions to broadcast services.

Applications on the client device are registered with the transport layer. The transport layer maintains the data handlers for each registered application, and retrieves the TOC from the logical packets that are received from the network layer. The transport layer notifies the registered applications that data streams will be available in the next frame transmission as identified with the service ID. Each application program applies a series of metrics to determine priority for the receipt of data streams, which are submitted to the transport layer in the client device. Prioritization is performed independently by each application on the client device based on any criteria such as preferred data, error correction requirements, as well as base and elevated priority levels. The transport layer reviews all of the requests, decides which requests will be accepted, and translates the accepted requests into packet requests to the network layer. The network layer retrieves the relevant packets in the next frame transmission and passes the packets to the relevant registered applications via the data handlers.

Figure 4B:
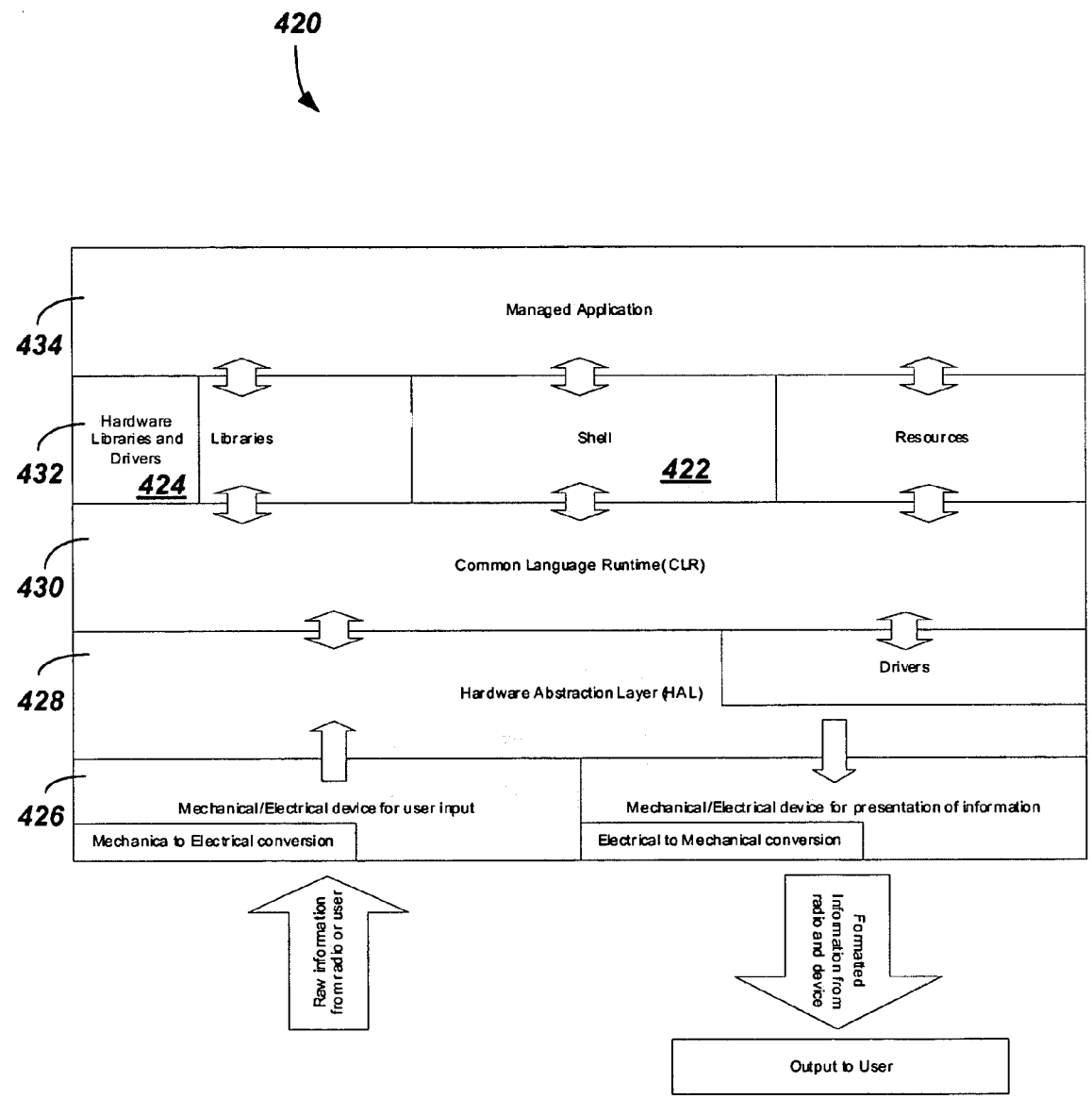
FIG. 4B is a functional block diagram of a watch device according to an embodiment of the invention.

Referring to FIG. 4B, a functional block diagram of a wireless client device 420 is shown. As described herein, the client devices offer a flexible and customizable programming environment, based on .NET Framework standard languages, mainly C#, for example. The devices execute intermediate language (IL) produced by the existing and commercially available .NET compilers. Applications may use and extend the various libraries; a Shell Library 422 and a Hardware library 424, for example. The Shell library 422 and Hardware 424 library collaborate to format information received not only from a user's input, but also received wireless signals. The device presents the formatted information to the user leveraging various mechanical and/or electrical mechanisms, described below.

The lowest layer in the architecture is the Mechanical/Electrical layer 426 and operates to, among other things, gather raw input from the wireless signals, here the received FM transmission and/or the user. This layer 426 also operates to present a user with formatted information in response to raw input and/or the user interaction itself. To enable operation in this software driven environment, the mechanical or analog display outputs require a mechanical to electrical built in conversion whose result is going to be handled by a Hardware Abstraction Layer (HAL) 428. The HAL layer 428 serves as an interface layer between raw electrical signals and bit encoded information. The HAL layer 428 offers generalization over underlying hardware, so that different hardware components that present similar characteristics can be treated in a homogeneous way by the Common Language runtime (CLR) layer 430.

With continuing reference to FIG. 4B, the CLR layer 430, manages the execution of the application and provides all the services and type system implementation for executing standard IL language. For this embodiment, the CLR and HAL layers 430 and 428, respectively, interact to provide an operating system (OS) environment for application programming and execution. The CLR layer 430 convoys and consolidates hardware events to and from the HAL layer 428 and exposes them for consumption to the libraries layer 432, as well as gathering various events from library layers calls.

According to this embodiment, libraries are implemented in high NET framework languages and are compiled into IL code. Libraries are object oriented APIs and are the only layer exposed to application programmers, offering a safe execution environment. The device 420 utilizes a number of libraries including Hardware libraries and managed driver libraries offering an object oriented API capable of driving the underlying hardware while listening and reacting to the hardware events, such as a button press or a wireless signal capture event. According to other embodiments, the libraries and drivers may be extended to fit to various H/W characteristics.

As described above, each client device includes a processor having an ARM 7 (or 9) core with additional functionalities such as: general purpose I/O (GpIO), VTU (Versatile Timer Unit); SPI and others features meant to drive and communicate with hardware; VTU exposes distinct Pulse Width Modulation (PWM) functionalities as well as input capture functionalities. The external hardware, including the various analog (mechanical) indicators described herein, is abstracted into a set of objects in the Shell 422 and H/W 424 libraries. Those objects expose the feature of interest of the H/W to the managed application and leverage the processor capabilities to communicate and drive the hardware. The hardware and the application preferably provide 2 way interaction: the application can collect data from the H/W by mean of both push and pull mechanisms and can force H/W to enter a particular state, therefore driving it. Thus, the communication to and from the hardware layer 432 and the application layer 434 is bidirectional built on top of the API object model.

As described above, Application inputs though the H/W may consist of user input and wireless signal data received over the wireless signal channel, radio for example, or through a connection (COM or USB) to a host PC or again through direct user input. The output of the application consist of elaborated data directed to an application running on the host PC or to the electrical and/or mechanical media designed to present the user with the information.

The object API and its interaction with the CLR and the underlying HAL layer allow the application programmer to express the information with a very wide variety of mechanisms. The presentation layer may use visual, tactile and acoustic mechanisms which may be electrical or mechanical, LED and LCD displays, hands, dials, rings, disks and in general any motion or motionless mechanism that can be driven out of an electrical modulated source and produce a tactile, visible, and/or acoustic feedback. Those skilled in the art will appreciate the various mechanisms useful for conveying information to a user and the invention is not intended to be limited by any examples or illustrations described herein.

The mechanisms are programmable by controlling the production and modulation of an electrical signal from the object API layer. For example, one implementation uses general API capable of driving the GpIO and VTU circuits of the core or by using more sophisticated and peculiar drivers that may use those underlying APIs or call directly into special purpose routines in the CLR and HAL layers. The libraries are designed to allow both push and pull programming paradigm: the CLR layer can call back into the libraries in response to a H/W event or libraries can poll the CLR layer 430 which in turn polls the HAL layer 428 to extract the H/W state and act upon a change.

Referring again to FIG. 3A, a watch device 300 is shown displaying information received from a wireless signal, a signal broadcast over a FM channel, for example. The watch device 300 is preferable to many consumers due to the refined and traditionally elegant appearance. The watch device 300 may include a combined analog and/or mechanical display for displaying a category or context and/or a value indication. For this example, a user of the watch has set the watch to a stock information channel using one of the selectors 308 described above. Optionally, the stock information channel may be included as a default channel based on user preference.

As described above, the watch device 300 includes analog or mechanical display features 310 and/or a digital display 314 for displaying information received from wireless signals transmitted from a radio-frequency (RF) driven source, preferably a frequency modulated source. The information contained in the wireless signals may include stock information, sports information, weather information, and other desired user information. The inventive watch device allows information received from wireless signals to be conveyed to a user using the analog and/or mechanical display features, described in detail below.

As depicted in FIG. 3A, a watch device 300 includes an analog display 310 for conveying information received from a wireless signal. For this example, information is also conveyed via the digital display 314. In conjunction, the two displays 310 and 314 convey information to a user based upon a currently selected channel. The user, using the user interface, may select the current channel for display. The user may also select an update rate for updating the display. The device 300 includes timing mechanisms for receiving wireless signals and disseminating information from the signals. The timing mechanisms may be adjusted according to user preference.

In alternative embodiments, channels may be automatically displayed as part of a rotating schedule. For example, the analog and digital displays 310 and 314 may update and convey stock information based a stock channel transmission for a predetermined time period. It is also possible to independently update each display. After the predetermined time period, two minutes for example, the analog and digital displays 310 and 314 may convey sports-related information based a sport channel transmission for a predetermined time period, which may be a different period as compared to other display periods. The timing and update features are applicable to the embodiments discussed below.

According to the example depicted in FIG. 3A, the watch device 300 is currently receiving wireless broadcast transmissions from a stock channel. An informational icon 316, a stock channel indicator for this particular example, alerts the user of the watch device 300 that the current channel is the stock channel. That is, a stock information icon 316 is displayed in the digital display 314, providing context to the user of the device 300. The stock information icon may also be displayed using an analog display, described further below. In conjunction, the two displays 310 and 314 convey information to a user based upon a currently depicted stock channel. The digital display 314 is informing the user that the watch device is currently receiving information from a stock channel.

The analog display 310 includes a pointer 312 and "plus" and "minus" indicators 313a and 313b. The "plus" and "minus" indicators correspond to positive and negative changes in the stock index according to the current channel displayed in the digital display 314. In another example, the "plus" and "minus" indicators may correspond to positive and negative changes relative to a contender in a sporting contest, such as a football game. A positive indication conveys to the user that the particular stock, team, etc. is up based on the current display.

The pointer 312 conveying the relative information is controlled in part by the information received from the wireless broadcast signals. As discussed above, after processing the wireless signals, the electronic system converts the information to control inputs for controlling the movement of the pointer 312. The electronic system also converts the information to control the output of the digital display 314. The gradated analog display alerts the user as to whether a major change, no change, or a minor change has occurred with respect to the currently displayed channel. The further the pointer 312 extends into the "plus" or "minus" sectors, the greater the change. As shown in FIG. 3, the pointer 312 of the analog display 310 conveys to the user that the particular stock channel shown in the digital display 314 (a NASDAQ channel for example) is unchanged at the moment. It will be appreciated that the watch device 300 may include other informational icons in the digital and/or analog displays as well and is not limited to any specific type of informational content.

For example, the watch device 300 may receive a transmitted message including a stock quote from a stock channel broadcast service. The broadcast service for the stock channel may have a series of subscribed stock quotes (e.g., MSFT, IBM, ORCL, etc.) that are indexed for an application on the client device. For this type of data stream, the stream locator identifies the starting location for the stock quote messages on the stock channel application for the client device. Each subsequent stock quote is a separate message that follows in sequence after the starting location identified by the stream locator. The client gathers all of the packets of the message before deserializing the content for the application layer.

Referring now to FIG. 3B, another watch device 330 is shown displaying information received from a wireless signal, a signal broadcast over a FM channel, for example. For this example, a user of the watch has set the watch to a stock information channel, NASDAQ, using one or more of a plurality selectors 332a-c similar to those described above in conjunction with FIG. 3A. However, selector 332b is a pushbutton type selector. As described above, the watch device 330 includes analog or mechanical display features 334 and/or a digital display 336 for displaying information received from wireless signals transmitted from a radio-frequency (RF) driven source, preferably a frequency modulated source. The information contained in the wireless signals may include stock information, sports information, weather information, and other desired user information, as described below.

As depicted in FIG. 3B, the watch device 330 includes an analog display 334 for conveying information received from a wireless signal. For this example, information is also conveyed via the digital display 336. In conjunction, the two displays 334 and 336 convey information to a user based upon a currently selected channel. The user, using the user interface, may select the current channel for display, as described above. The watch device 330 is currently receiving wireless broadcast transmissions from a NASDAQ stock channel. That is, the digital display 336, using a NASDAQ indicator 338 for this particular example, alerts the user of the watch device 330 that the current channel is a NASDAQ stock channel. The NASDAQ indicator may also be displayed using an analog display, described further below. In conjunction, the two displays 334 and 336 convey information to a user based upon a currently depicted stock channel.

The analog display 334 includes a pointer 340 and "plus" and "minus" indicators 340a and 340b. The "plus" and "minus" indicators correspond to positive and negative changes in the stock index according to the current channel displayed in the digital display 336. In another example, the "plus" and "minus" indicators may correspond to positive and negative changes relative to a contender in a sporting contest or to temperature changes, etc. The "plus" and "minus" indicators may also correspond to the potential for bad/good weather or financial conditions.

The pointer 340 conveying the relative information is controlled in part by the information received from the wireless broadcast signals. After processing the wireless signals, the electronic system converts the information to control inputs for controlling the movement of the pointer 340. The electronic system also converts the information to control the output of the digital display 336. The gradated analog display alerts the user as to whether a drastic change, no change, or a minor change has occurred with respect to the currently displayed channel, as described above. As shown in FIG. 3B, the pointer 340 of the analog display 334 conveys to the user that the NASDAQ stock channel is unchanged at the moment, based on the information received and processed by the watch device.

According to the examples depicted in FIGS. 3A and 3B, a small LCD or equivalent digital display may be used to display the category or context of information such as Nasdaq (stocks), barometer (weather), Yankees (sports), portfolio (investments), or appointment. Selectors on the side of the watch, or an equivalent button-functional interface is used to switch between various categories and/or contexts. An extra hand or similar analog device on the watch may be separately controlled to show the value based on the currently selected context. For some contexts, like Appointment, the pointer may be used to point to actual hour locations on the dial indicating the time of the next appointment (rather than using the +/− scale); the digital display could show the location or subject. Other types of information could use the 0-10 scale to show decimal values and fractions of values. A custom scale could also be printed using the whole dial—an example would be to print icons at hour locations such as cloudy, overcast, sunny, rainy, etc for weather. As an alternative the extra hand could be omitted and the existing hands could simply function as a temporary pointer when a new category is selected.

Figure 5A:
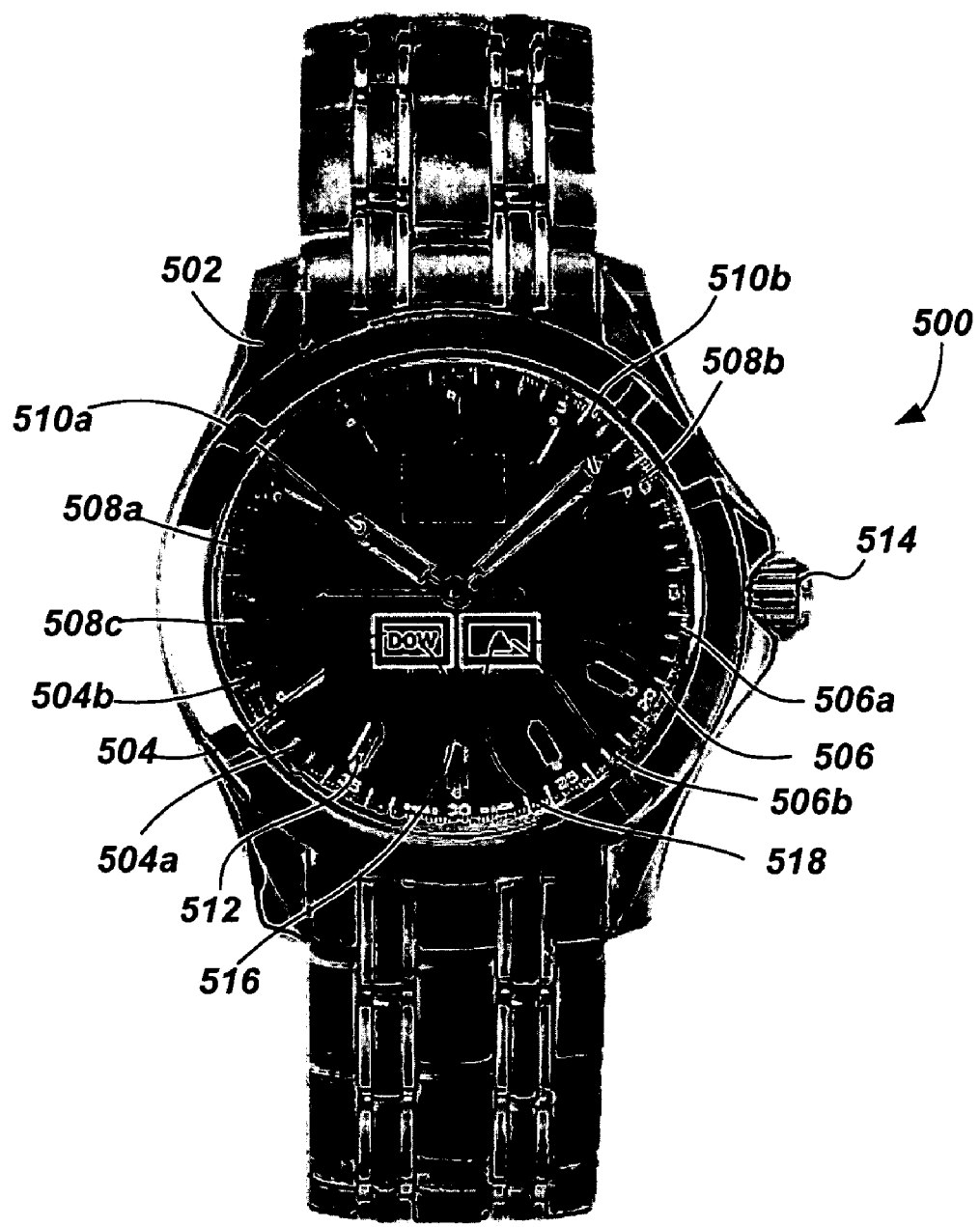
FIGS. 5A and 5B depict a watch device according to another embodiment of the invention.
Figure 5B:
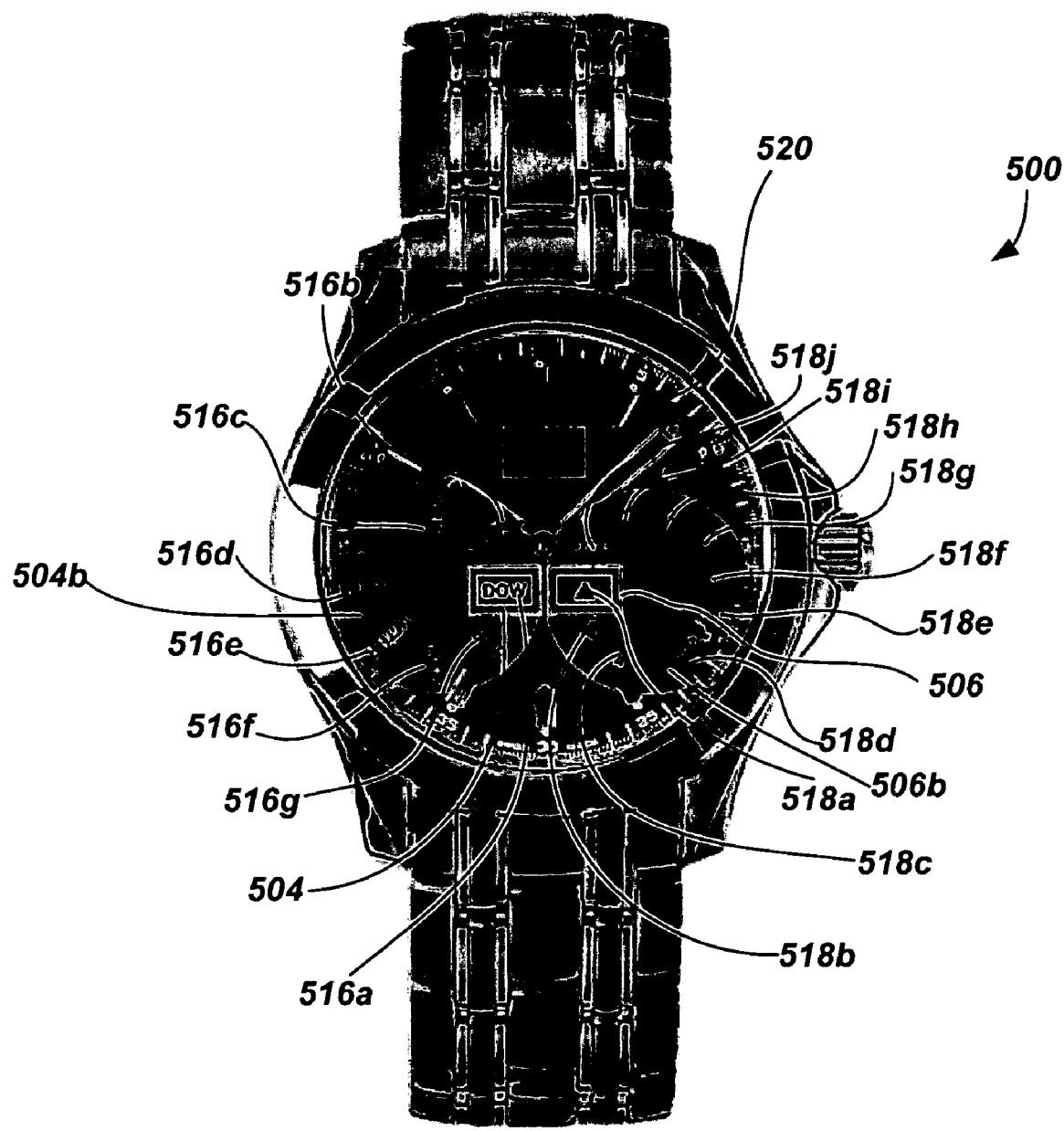

Referring now to FIGS. 5A and 5B, yet another exemplary watch device 500 is shown. The watch device 500 is displaying the current time and other information received from a wireless signal, a signal broadcast over a FM channel, for example. The watch device 500 is tuned to receive and disseminate transmissions from the FM transmitter. As shown in the FIGURES, the watch device 500 has a refined and elegant appearance, which is preferable for many consumers.

The watch device 500 includes a bezel 502, which preferably contains an electronic system. The bezel 502 includes a plurality of analog displays 504 and 506. The bezel also includes analog-type watch hands 508a-c for tracking hours, minutes, and seconds. In alternative embodiments, the watch hands may be used to track or draw attention to other information. For this embodiment, it is preferred that the hour and minute hands 508a and 508b also each include a light-emitting diode (LED) 510a and 510b, respectively. Each hour mark 512 also preferably includes an LED. The watch device 500 utilizes the LEDs, alone or in combination to convey information to a user of the device, as described further below. The watch device 500 also includes at least one selector 514 operable as a user interface (UI). The selector 514 operates according to both translational and rotational movement, allowing multiple functions to be performed based on how the selector is manipulated by the user (see the description with respect to FIG. 3 above).

As shown in FIG. 5A, first and second analog displays 504 and 506 are displaying information received from a stock channel. According to one embodiment, a user may set the watch to receive information from a stock information channel using the selector 514 described above. Optionally, the wireless signals may, in part, control what information the watch displays, based on the information contained in the wireless signals. According to this embodiment, the watch device 500 utilizes two analog displays and/or at least one LED to display information received from wireless signals transmitted from a radio-frequency (RF) driven source, preferably a frequency modulated source.

The first and second analog displays 504 and 506, in conjunction, convey information to a user based upon a currently selected channel. For this embodiment, the analog displays 504 and 506, each include a window fabricated as part of the watch face and an information indicator mechanism including a plurality of informational icons, described below. The first analog display includes window 504a and information indicator mechanism 504b. As depicted in FIG. 5A, the watch device is currently receiving wireless broadcast transmissions from a DOW Jones index stock channel. An informational icon 516 of the first analog display, a DOW stock channel indicator for this particular example, alerts the user of the watch device 500 that the watch device is utilizing DOW stock information from the wireless signals. The user knows that the watch is utilizing DOW stock information based on the DOW information icon being displayed in the window of the first analog display 504.

The second analog display 506 also includes a window 506a and an informational indicator mechanism 506b including a plurality of informational icons. An informational icon 518 of the second analog display provides additional information to the user based on the icon displayed in the first analog display 504. For example, the second analog display 506 is currently displaying an informational icon having an upwardly pointing arrowhead or right-side-up triangle, thereby providing a relative value. The informational icon 518 alerts the user of the watch device 500 that DOW stock index is up for the day or positive, based on the symbols displayed by the first and second analog displays.

With additional reference now to FIG. 5B, the first and second analog displays 504 and 506 are shown in greater detail. The first analog display includes an information indicator mechanism 504b. The information indicator mechanism 504b includes a plurality of informational icons 516a-g. In similar fashion, the second analog display includes an information indicator mechanism 506b. The information indicator mechanism 506b also includes a plurality of informational icons 518a-j. When displayed, each informational icon conveys a distinct type of information to a user of the watch device 500. In conjunction, informational icons 516a-g and 518a-j provide information to a user based on wireless signals received and processed by the watch device 500. More particularly, informational icons 518a-j may be described as providing relative and/or specific information with respect to informational icons 516a-g.

For example, as shown in FIGS. 5A and 5B, the watch device 500 is displaying a DOW informational icon 516a in the first analog display 504. The positive arrow indicator 518a of the second analog display 506, informs the user that the DOW is up at the present time based on the information received and processed from the wireless signals. When displayed, the negative arrow indicator 518b of the second analog display 506 conveys to the user that the DOW is down at the present time. Continuing, when displayed, the no-change indicator 518c of the second analog display 506, conveys to the user that the DOW has not changed.

The first analog display 504 also includes other stock indicator icons 516c-d and 516f-g which are associated with different stock information. Stock indicator icon 516b corresponds to the New York stock exchange (NYEX), stock indicator icon 516c corresponds to the American stock exchange (AMEX), stock indicator icon 516f corresponds to the NAS-DAQ stock exchange (NASD), and stock indicator icon 516g corresponds to the Standard & Poor's (S&P). As described above, informational icons 518a-c may be used in conjunction with informational icons 516a-c and 516f-g to convey relative and/or specific stock information to a user of the watch device 500.

With continuing reference to FIG. 5B, the first analog display 504 also includes a barometer icon (BARM) 516d and a weather icon (WTHR) 516e. Informational icons 518a-c of the second analog display may also be used in conjunction with both the barometer and weather icons to convey rising, unchanging, or decreasing pressures and temperatures. The second analog display 506 further includes weather indicator icons 518d-j, used in conjunction with the weather icon 516e to convey specific weather information to a user of the watch device 500. When displayed, each weather indicator icon conveys information, that is: weather indicator icon 518d informs the user of snow or ice or a chance of snow or ice; weather indicator icon 518e informs the user of a thunderstorm or a chance of a thunderstorm; weather indicator icon 518f informs the user of rain or a chance of a rain; weather indicator icon 518g informs the user of clouds with some rain; weather indicator icon 518h informs the user of partly cloudy forecast; weather indicator icon 518i informs the user of partly sunny forecast; and, weather indicator icon 518j informs the user of a sunny forecast. It should be noted that the device may provide weather information to a user based on the user's current location or some predetermined location.

For this embodiment, each information indicator mechanism may be in the form of a disk or wheel located behind the watch face 520, so that the user only sees an icon displayed through the windows 504a and 506a. It will be appreciated that other mechanisms may be utilized for the information indicator mechanism 504b, such as a rotating drum, rotating tape, etc. Whatever mechanism is used for the information indicator mechanism, it should be designed to be pleasing to the eye, i.e. elegant. The information indicator mechanism 504b, a disk for this embodiment, may be driven by a motor, piezoelectric devices, and the like, based on wireless signals received and processed by the electronic system. Each disk may be rotated to display a particular icon based upon the information processed from the wireless signals by the electronic system.

Figure 6:
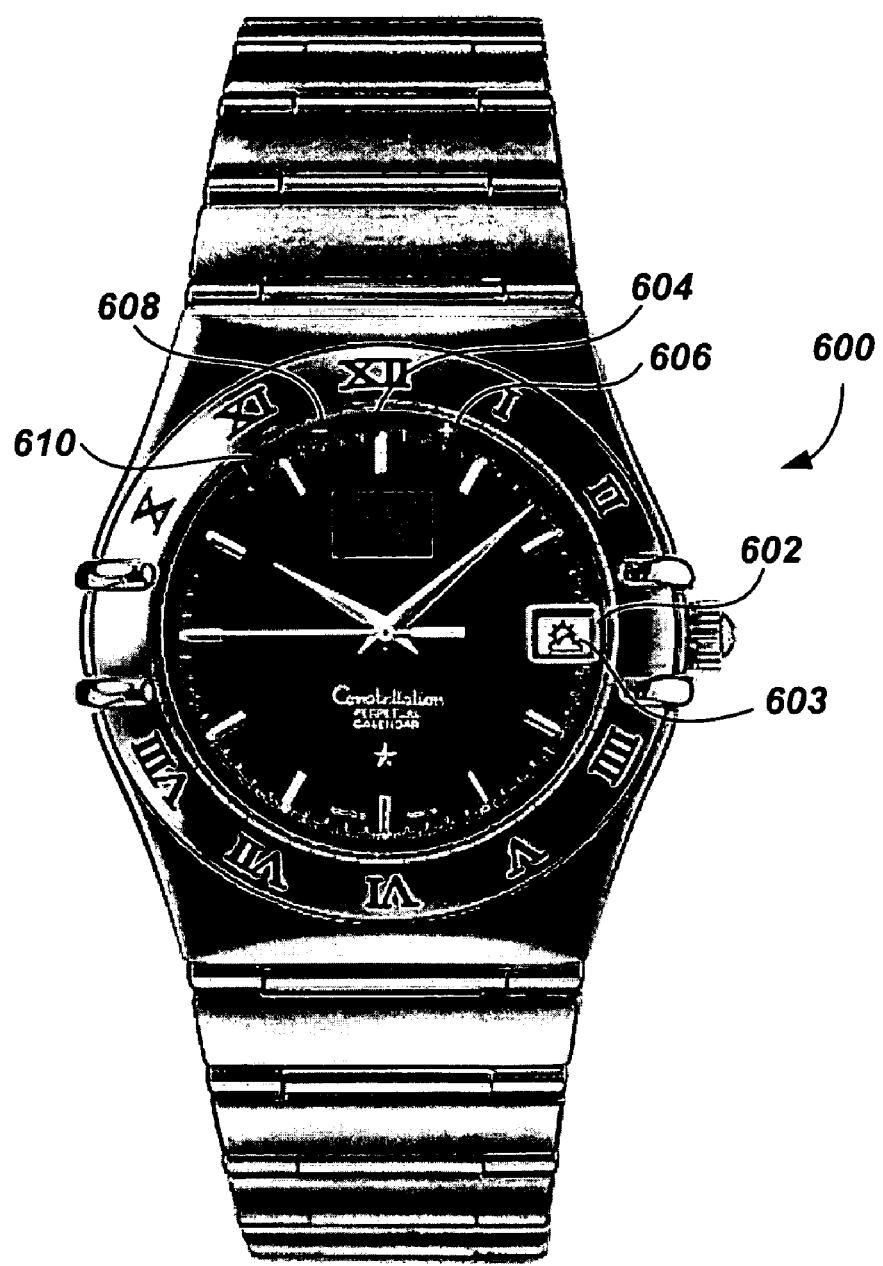
FIG. 6 depicts a watch device according to another embodiment of the invention.

Referring now to FIG. 6, yet another exemplary watch device 600 is depicted. Watch device 600 includes an analog display 602 similar to the analog display described above in conjunction with FIGS. 5A and 5B. The analog display 602 is informing the user that the weather is currently partly sunny. The watch device 600 also includes a gradated display 604 having "plus" and "minus" indicators 606 and 608, which provide relative indications of the information displayed in the analog display 602. An indicator 610 is operable to rotate around the gradated display, informing the user of the intensity, severity, gain, loss, likelihood, etc. of the informational icon 603 displayed in the analog display 602. The more positive the position of the indicator 610, the greater the intensity, severity, gain, probability likelihood, etc. The more negative the position of the indicator 610, indicates greater loss, less intense, severe, or probability likelihood according to the informational icon 603 displayed in the analog display 602. The indicator 610 may be implemented as a series of LEDs located around the circumference of the bezel, a mechanical or analog rotational device, or a digital display, such as an LCD, controlled based on the information received from the wireless signal transmission.

Figure 7A:
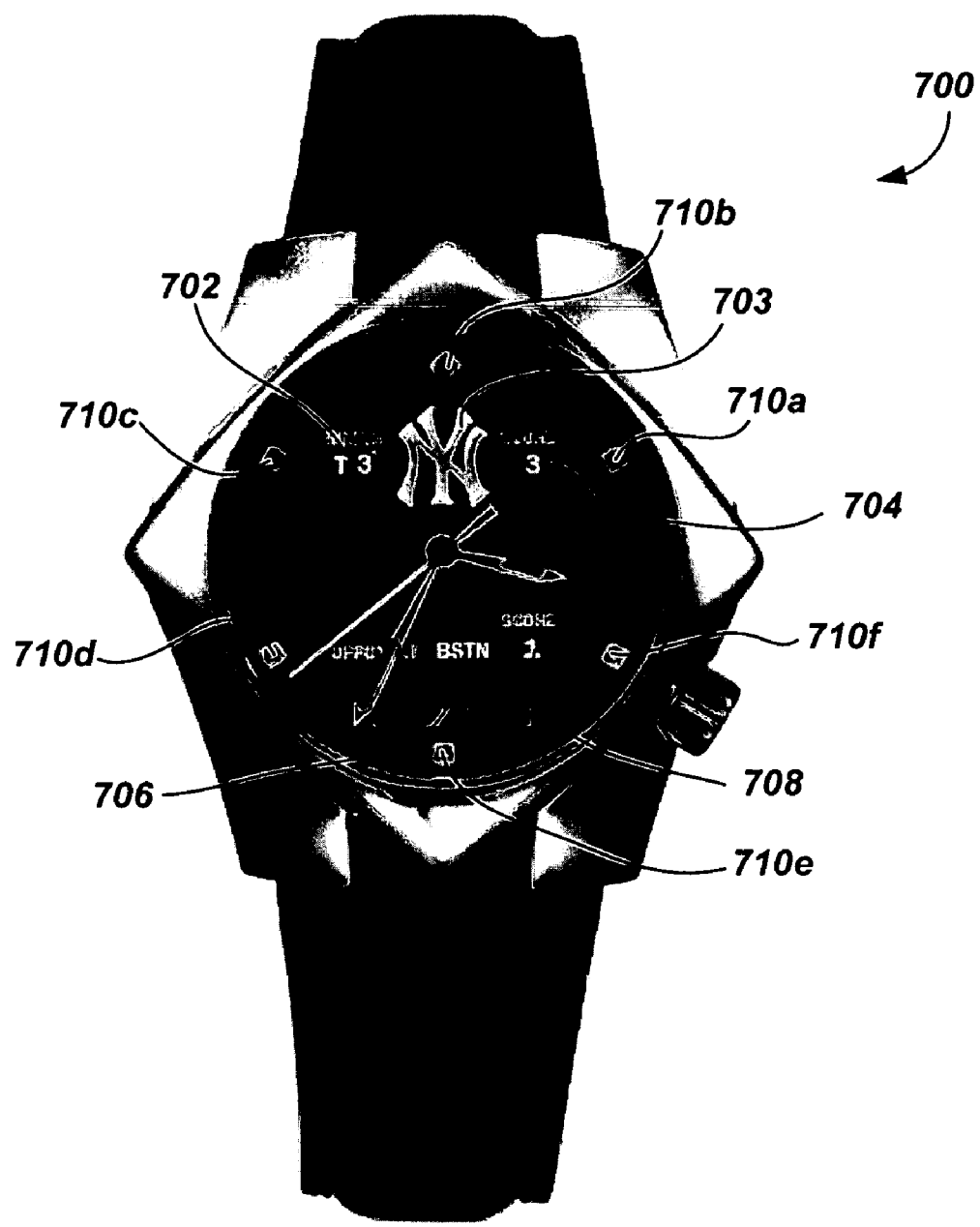
FIGS. 7A and 7B depict a watch device according to yet another embodiment of the invention.
Figure 7B:
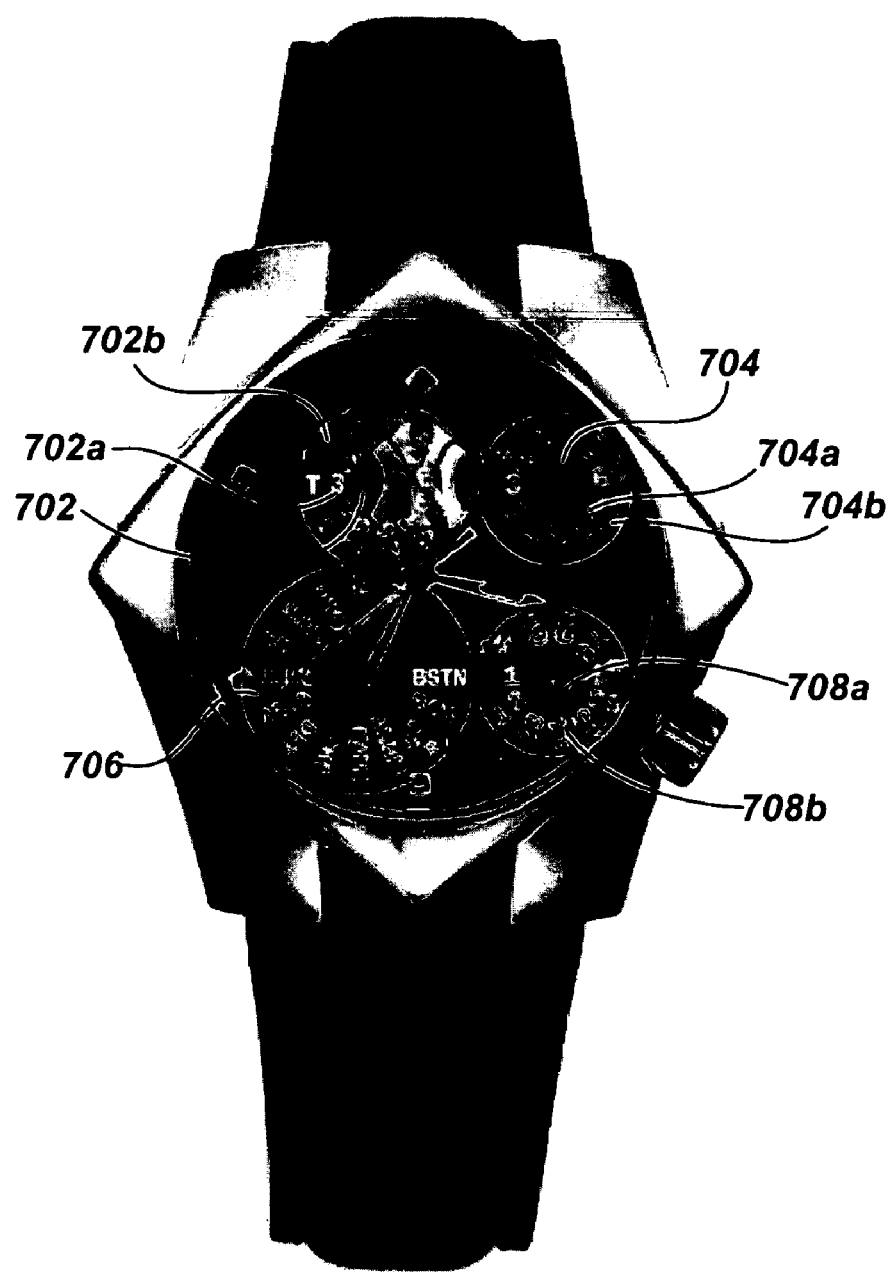

According to the invention, a watch device may be tailored to a particular consumer's requirements, a particular sports team, for example. Referring to FIGS. 7A and 7B, another exemplary watch device 700 is shown. The watch device 700 is tailored to satisfy certain requirements of a sports fan, a New York Yankee fan for this example. The watch device 700 includes a plurality of analog displays, four according to this embodiment, a first analog display 702, second analog display 704, third analog display 706, and fourth analog display 708.

According to this example, a user ordered the watch device 700 based on his/her zeal as a New York Yankee fan. Based on this, the watch device 700 is fabricated with the New York Yankee logo 703. The first analog display 702, informs the user of the current inning of a baseball game, the top of the third inning for this example. The second analog display 704 informs the user that the Yankees have 3 runs. Third analog display 706 informs the user that the Yankees are playing Boston, who currently have 1 run, according to fourth analog display 708. Based on information received from a wireless sports channel transmission, the analog displays inform the user of a favorite team's game status, for example.

As shown in FIG. 7B, the first analog display 702 includes first and second rotatable disks 702a and 702b. First disk 702a informs a user of the current inning. Second disk 702b, informs the user as to which team is at bat, i.e. top or bottom of the current inning. The second disk 702b is also operable to display extra innings. The second analog display 704 includes first and second rotatable disks 704a and 704b. First disk 704a informs a user of the current run amount in single digits. Second disk 704b, when displayed, informs the user of current run amount in increments of ten. The third analog display 706 informs the user of the Yankee's current opponent, the Boston Red Sox, for this example. The fourth analog display 708 also includes first and second rotatable disks 708a and 708b. First disk 708a informs a user of the current run amount in single digits. Second disk 708b, when displayed, informs the user of current run amount in increments of ten.

Figure 8:
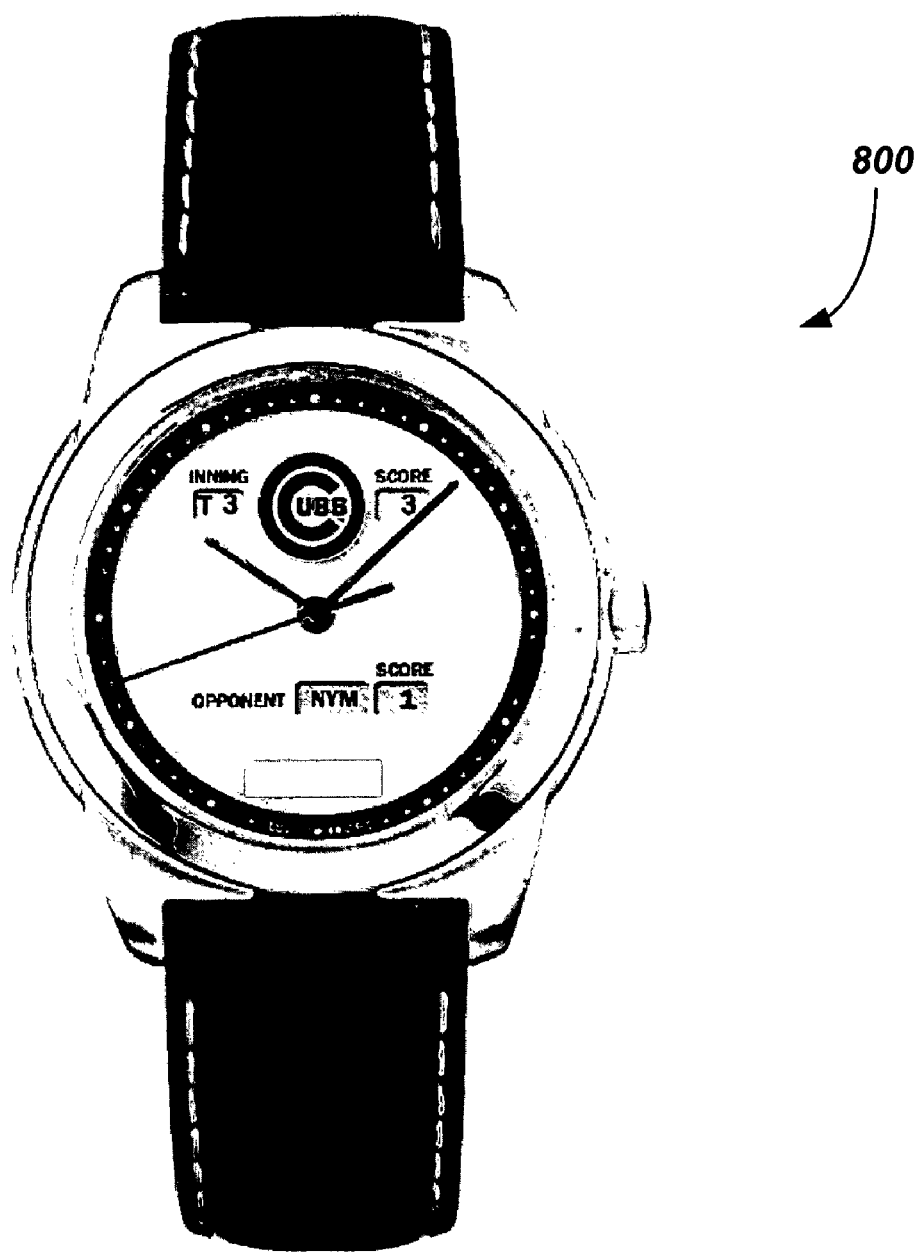
FIG. 8 depicts a watch device according to an embodiment of the invention.

It will be appreciated that the analog displays may be tailored to a variety of events, such as football, hockey, golf, etc. according to a user's preference. Optionally, the watch device 700 may be fabricated having a number of LED 710a-f, for alerting the user to various events of a game, etc., in addition to the analog displays. Thus, a common module may be produced and re-used for similar applications, that is, for other teams, etc. For example, FIG. 8 depicts a watch device 800, having the same watch module, but tailored to meet the needs of a Chicago Cubs fan, i.e. a different color scheme, logos, etc.

Figure 9A:
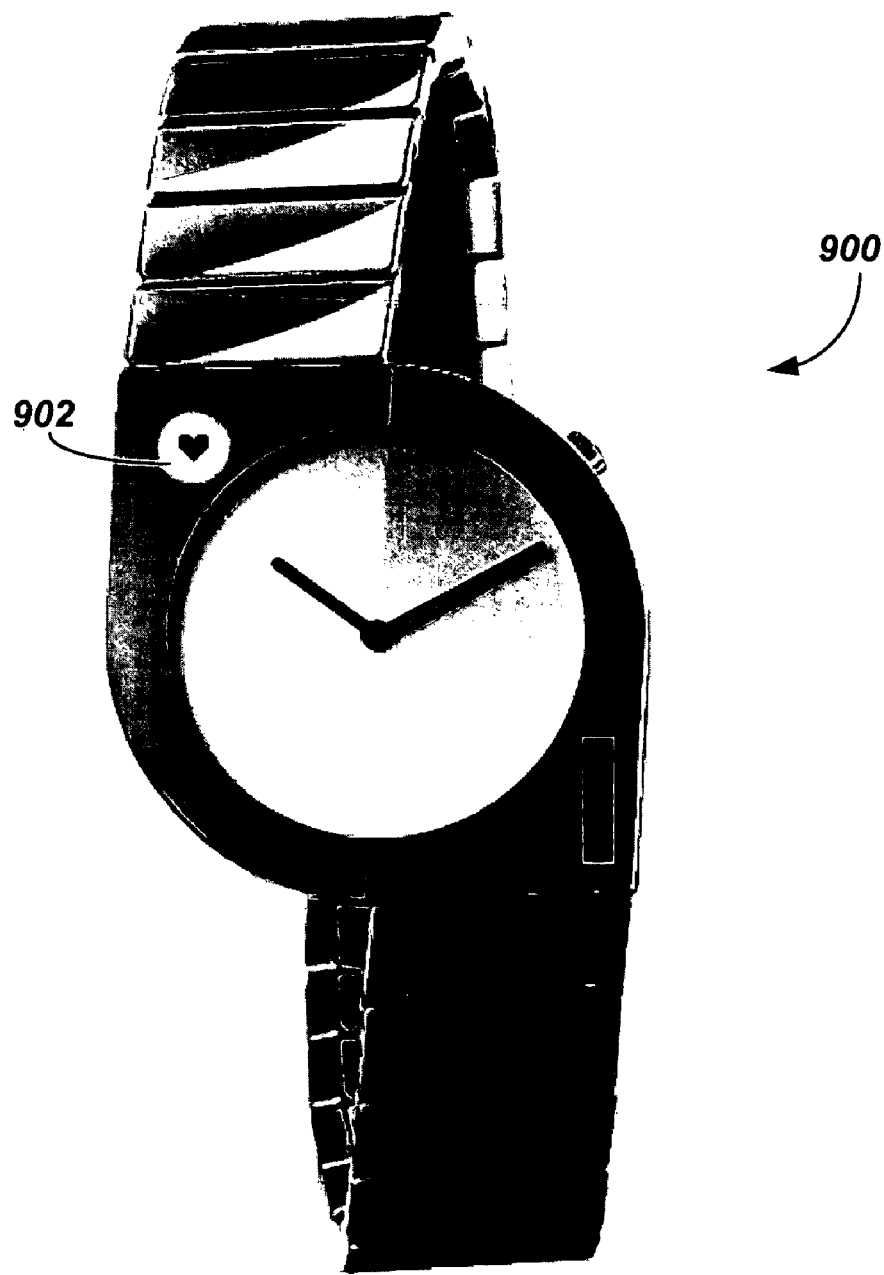
FIGS. 9A and 9B depict a watch device according to another embodiment of the invention.
Figure 9B:
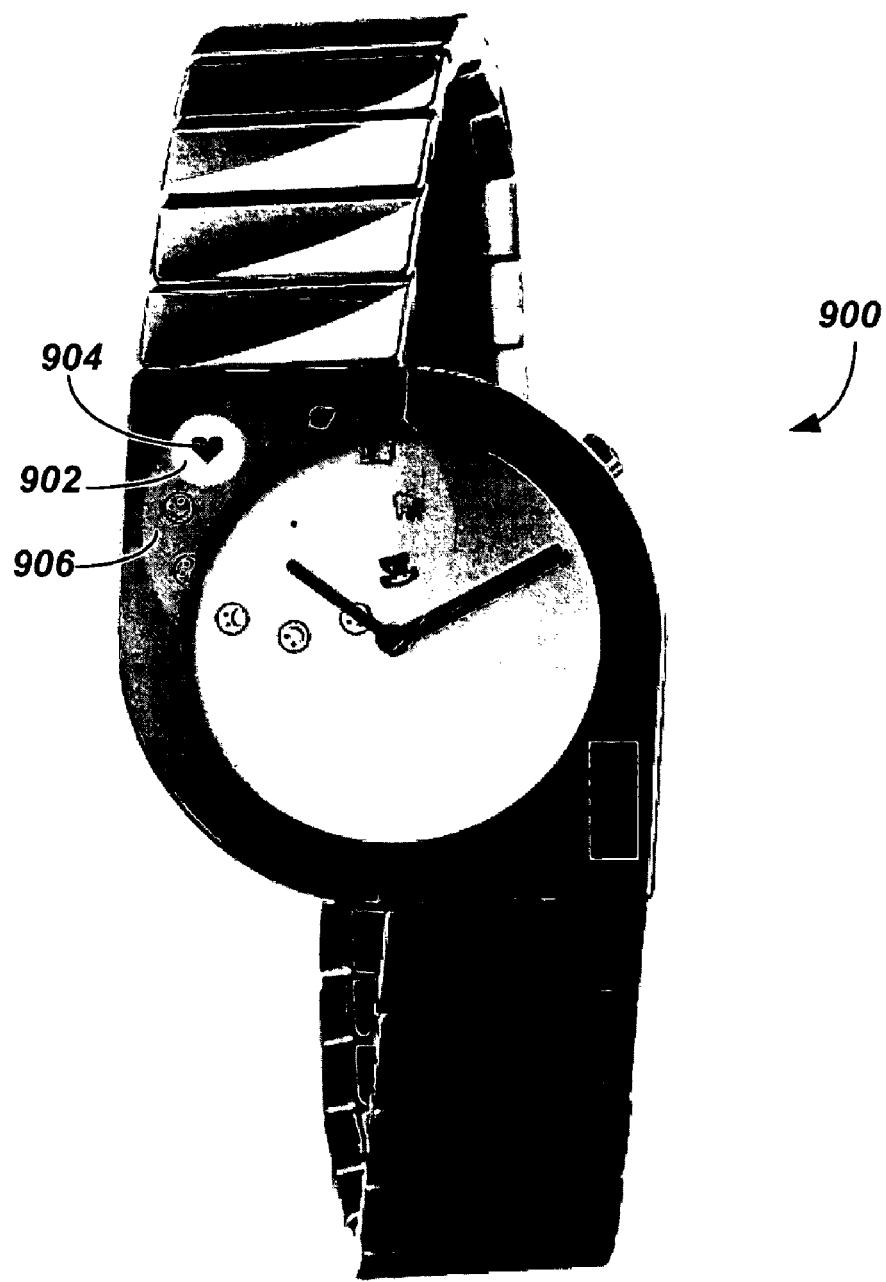

FIGS. 9A and 9B depict a watch device 900 operable to display an "instant" icon or emoticon based on information received from wireless signal transmissions. The watch device 900 includes an analog display 902 for displaying information received from wireless signals by the watch device 900. The analog display 902 includes a plurality of informational icons 904 distributed on a rotatable disk 906. The watch device 900 is operable to display a heart, happy, sad, and other emoticons based on the information received and processed from the wireless signal transmission. The watch device 900 is also operable to inform the user to call home, check e-mail, etc. based on a currently displayed icon 904.

Figure 10:
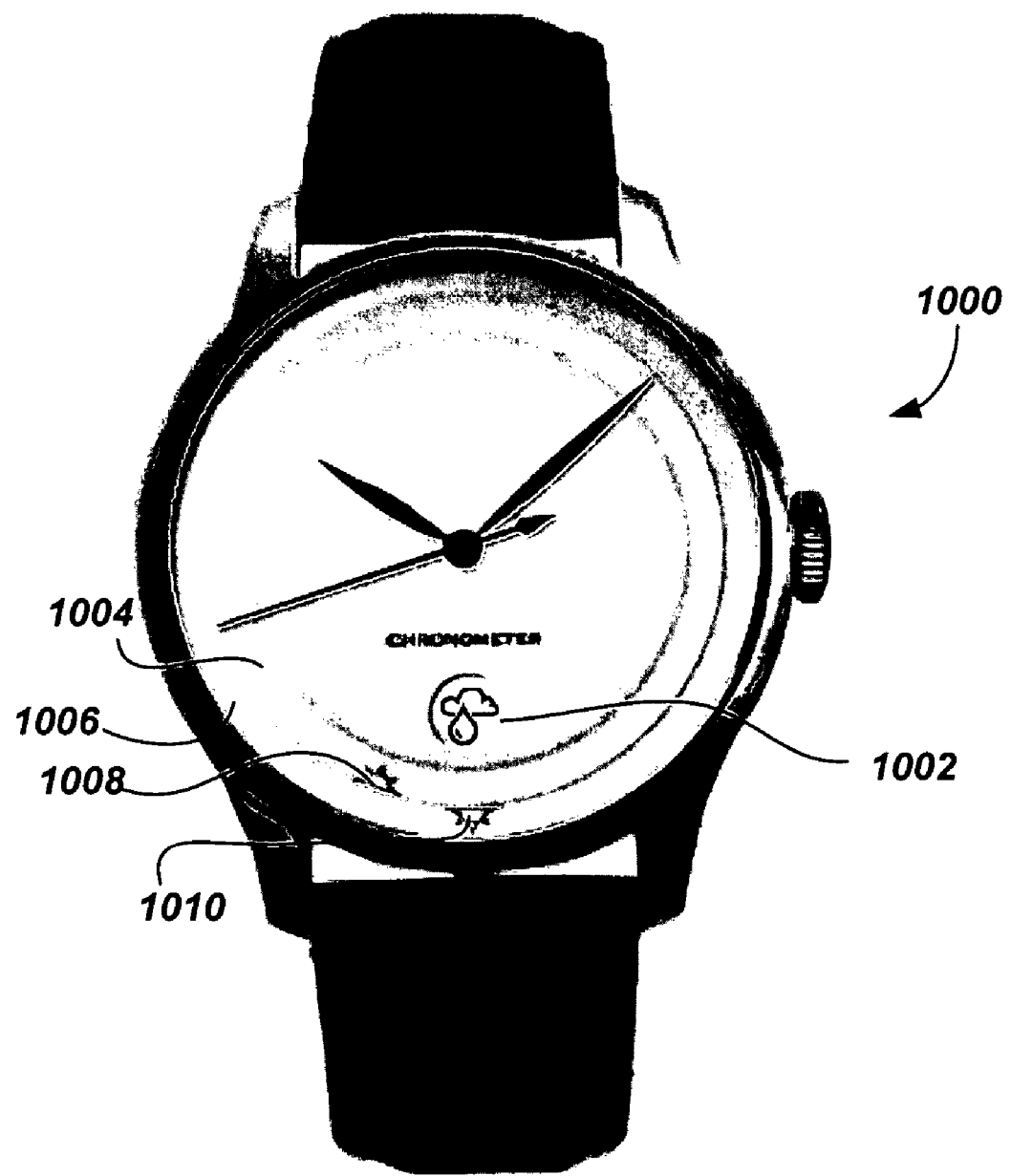
FIG. 10 depicts a watch device according to an embodiment of the invention; and, FIG. 11 illustrates various alternative embodiments of the invention.

FIG. 10 depicts yet another exemplary watch device 1000. Watch device 1000 includes a plurality of analog displays 1002, 1004, and 1006. First analog display 1002 is similar to the analog display descried above in conjunction with FIGS. 5A and 5B. For some categories of data the data value can be expressed as an icon that conveys both value and context. For this example the cloud with drop icon infers rainy weather, a zig-zag upward arrow would indicate that the user's portfolio is up, etc. Second and third analog displays 1004 and 1006 are fabricated as rotatable perimeter disks having information icons 1008 and 1010 (sunrise and sunset, for this example) imprinted thereon. The second and third analog displays 1004 and 1006 operate to indicate times for sunrise and sunset. The watch device 1000 displays the times of sunrise and sunset according to the user's location or some other location. As shown in FIG. 10, sunrise takes place around 7am and sunset takes place around 6p.

In various alternative embodiments, one or more of the LEDs may be used to convey information to the user of the watch device. For example, the LEDs may be caused to display "red" when a particular stock index or team is down for the day, or if the weather is severe or threatening. The LEDs may be caused to display "green" when a particular stock index or team is up for the day, or if the weather is pleasant, for example. Vibration and/or sound output from the tactile interface 276 and/or audio interface 274 may also be used to convey information to a user of the watch device based on received and processed wireless signals. For example, the watch device may be caused to vibrate and/or emit a sound if the user's team wins a game or if a significant change has occurred in a stock portfolio. The vibration and/or sound may be modulated at different frequencies according to different events, for example a loss, win, stock up or down, extra innings or periods, etc. It will be appreciated that each information indicator mechanism may be fabricated to include greater or fewer informational icons operable to convey different types of content, and the invention is not intended to be limited by any examples and/or embodiments disclosed herein.

Figure 11:
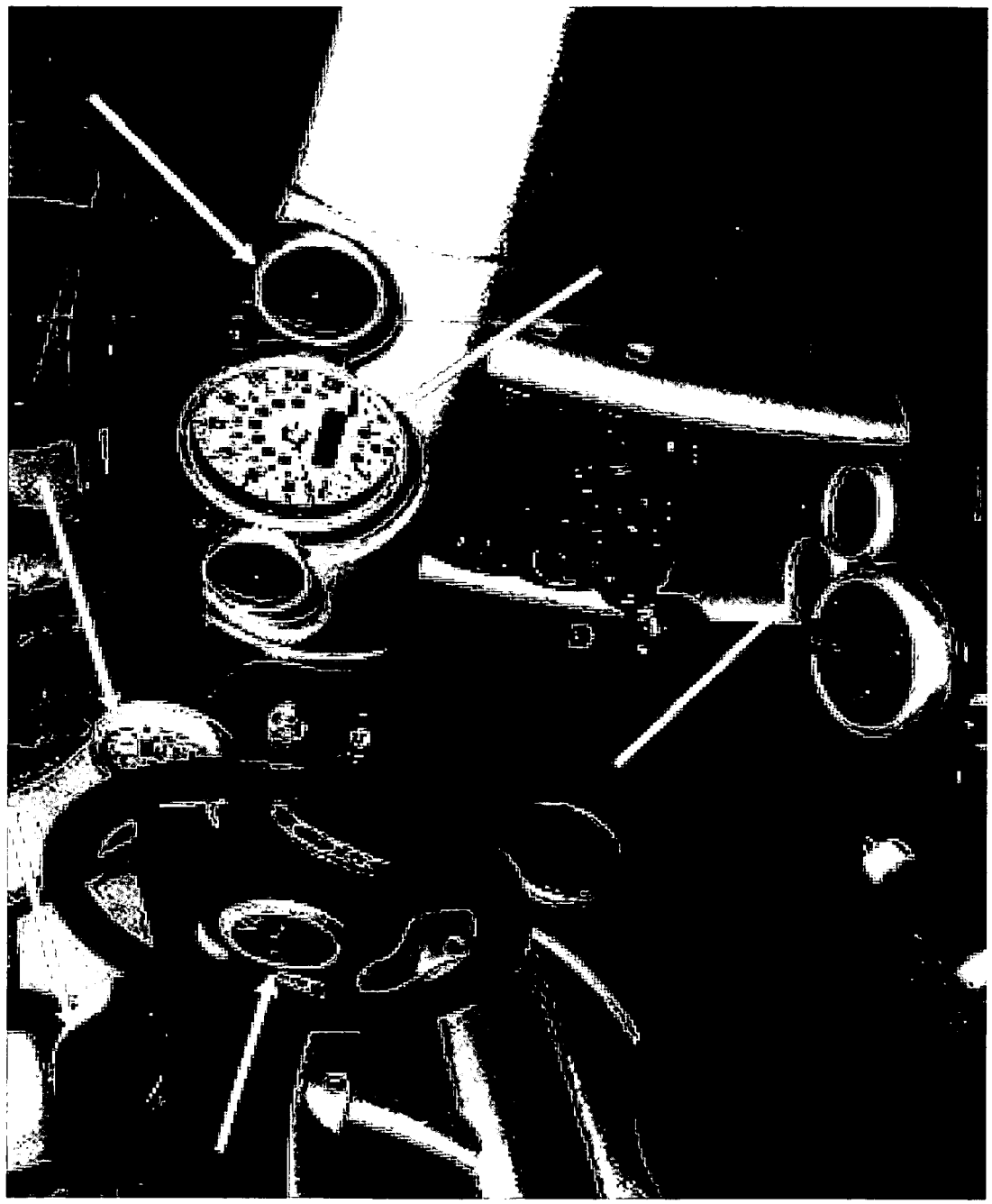

The present invention is not limited to a watch device. For example, the arrows in FIG. 11 point to locations in a vehicle where the present invention may be implemented. The invention may also be implemented in larger objects which would not look right without retaining their aesthetic qualities, like a grandfather or cuckoo clock, for example. The invention is equally applicable to these types of items and others. The information contained in the wireless signals may include stock information, sports information, weather information, and other desired user information. Furthermore, the invention is not limited to any specific type of information that a device may convey. For example, a device, such as a grandfather clock, could have a different chime count or tone, which may alert a person to take certain medication, etc.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A wristwatch apparatus comprising:
a mechanical selector having a first mechanical display indicator, wherein the first mechanical display indicator includes a plurality of icons that mechanically indicate available public frequency modulated (FM) channels, wherein each of the available public FM channels includes a different message content, wherein mechanical selection of an icon that indicates an available public FM channel causes retrieval of message content received from the available public FM channels, wherein the retrieval of the message content includes message content from the selected available public FM channel indicated by the icon of the first mechanical indicator of the mechanical selector, wherein the retrieval of the message content from the selected available public FM channel indicated by the icon of the first mechanical indicator of the mechanical selector causes the generation of control signals, wherein the control signals are generated by accessing a managed hardware driver library within the wristwatch apparatus and generating the control signal according to an API of one of the hardware drivers in the managed hardware driver library, wherein the control signals cause the mechanical movement of a second mechanical display indicator to mechanically indicate information according to the message content from the selected available public FM channel indicated by the icon of the first mechanical indicator of the mechanical selector;
an FM receiver integrated in the wristband of the wristwatch apparatus for receiving FM signals from each of the available public FM channels, wherein each of the available public FM channels includes information associated with the different message content;
an electronic system for receiving the mechanical selection of the available public FM channel according to the first mechanical display indictor, processing the selection according to an API for a first mechanical display indicator hardware driver in the hardware driver library to cause retrieval of information in the FM signal related to the selection by the first mechanical display indictor, extracting the information from the received FM signal, accessing the hardware driver library within the wristwatch apparatus, and generating the control signal based on an API of a second mechanical display indicator hardware driver in the hardware driver library to cause the mechanical movement of the second mechanical display indicator according to the information extracted from the received FM signal; and
a display for mechanically displaying the information extracted by the electronic system, wherein the display includes the first mechanical display indicator and the second mechanical display indicator, wherein the first mechanical display indicator includes the icon that indicates the selected available public FM channel, wherein the second mechanical display indicator includes the information in the context of the icon that mechanically indicates the selected available public FM channel.

2. The wristwatch apparatus of claim 1 wherein the FM receiver further comprises operational functionality in a FM frequency range.

3. The wristwatch apparatus of claim 1, wherein the second mechanical display indicator further comprises at least one mechanical indicator consisting essentially of a tactile, audible, or visual mechanism.

4. The wristwatch apparatus of claim 1, wherein the FM signals comprise message packets having at least one frame, wherein each frame includes a header, a table of contents and a message payload associated with at least one member of a group comprising: a time service, a message service, a contact service, a calendar service, a weather service a stock service, a news service, a sports service, and a game service.

5. The wristwatch apparatus of claim 1, wherein the display further comprises a third display indicator, and a fourth display indicator, wherein the third display indicator provides a context and the fourth display indicator provides a value related to the context.

6. A wireless client device comprising:

a mechanical selector having a first mechanical display indicator, wherein the first mechanical display indicator includes a plurality of icons that mechanically indicate available public frequency modulated (FM) channels, wherein each of the available public FM channels includes a different message content, wherein mechanical selection of an icon that indicates an available public FM channel causes retrieval of message content received from the available public FM channels, wherein the retrieval of the message content includes message content from the selected available public FM channel indicated by the icon of the first mechanical indicator of the mechanical selector, wherein the retrieval of the message content from the selected available public FM channel indicated by the icon of the first mechanical indicator of the mechanical selector causes the generation of control signals, wherein the control signals are generated by accessing a managed hardware driver library within the wristwatch apparatus and generating the control signal according to an API of one of the hardware drivers in the managed hardware driver library, wherein the control signals cause the mechanical movement of a second mechanical display indicator to mechanically indicate information according to the message content from the selected available public FM channel indicated by the icon of the first mechanical indicator of the mechanical selector;

an FM receiver for receiving FM signals from each of the available public FM channels, wherein each of the available public FM channels includes information associated with the different message content;

a processor for receiving the mechanical selection of the available public FM channel according to the first mechanical display indictor, processing the selection according to an API for a first mechanical display indicator hardware driver in the hardware driver library to cause retrieval of information in the FM signal related to the selection by the first mechanical display indictor, extracting the information from the received FM signal, accessing the hardware driver library within the wristwatch apparatus, and generating the control signal based on an API of a second mechanical display indicator hardware driver in the hardware driver library to cause the mechanical movement of the second mechanical display indicator according to the information extracted from the received FM signal;

a display for mechanically displaying the information extracted by the processor, wherein the display includes the first mechanical display indicator and the second mechanical display indicator, wherein the first mechanical display indicator includes the icon that indicates the selected available public FM channel, wherein the second mechanical display indicator includes the information in the context of the icon that mechanically indicates the selected available public FM channel; and a power supply for providing power to the wireless client device.

7. The wireless client device of claim 6 further comprising a smart watch device.

8. The wireless client device of claim 6, wherein the FM receiver is operable to receive FM signals from an FM source.

9. The wireless client device of claim 6, wherein at least one of the first and second mechanical display indicators comprise at least one disk having at least one iconic symbol for conveying the information extracted from the received FM signal.

10. The wireless client device of claim 6, wherein at least one of the first and second mechanical display indicators comprise at least one disk having at least one textual display for conveying the information extracted from the received FM signal.

11. The wireless client device of claim 6, wherein at least one of the first and second mechanical display indicators comprise a first disk having at least one iconic symbol and a second disk having at least one textual display, the first and second disks operating in conjunction to convey the information extracted from the received FM signal.

12. The wireless client device of claim 6, wherein at least one of the first and second mechanical display indicators comprise a first disk having at least one numeric symbol and a second disk having at least one textual display, the first and second disks operating in conjunction to convey the information extracted from the received FM signal.

13. The wireless client device of claim 6, wherein at least one of the first and second mechanical indicators comprise a gradated area and a pointing means for pointing to a portion of the gradated area and operating to convey the information extracted from the received FM signal.

14. The wireless client device of claim 6, wherein the display further comprises a digital display.

15. A system for conveying information comprising:

a frequency modulated (FM) signal transmitter for transmitting FM signals, wherein the FM signals include a message payload for an FM channel; and a device for receiving the FM signals including:

a mechanical selector having a first mechanical display indicator, wherein the first mechanical display indicator includes a plurality of icons that mechanically indicate available public frequency modulated (FM) channels, wherein each of the available public FM channels includes a different message content, wherein mechanical selection of an icon that indicates an available public FM channel causes retrieval of message content received from the available public FM channels, wherein the retrieval of the message content includes message content from the selected available public FM channel indicated by the icon of the first mechanical indicator of the mechanical selector, wherein the retrieval of the message content from the selected available public FM channel indicated by the icon of the first mechanical indicator of the mechanical selector causes the generation of control signals, wherein the control signals are generated by accessing a managed hardware driver library within the wristwatch apparatus and generating the control signal according to an API of one of the hardware drivers in the managed hardware driver library, wherein the control signals cause the mechanical movement of a second mechanical display indicator to mechanically indicate information according to the message content from the selected available public FM channel indicated by the icon of the first mechanical indicator of the mechanical selector;

an FM receiver for receiving FM signals from each of the available public FM channels, wherein each of the available public FM channels includes information associated with the different message content;

a processor for receiving the mechanical selection of the available public FM channel according to the first mechanical display indictor, processing the selection according to an API for a first mechanical display indicator hardware driver in the hardware driver library to cause retrieval of information in the FM signal related to the selection by the first mechanical display indictor, extracting the information from the received FM signal, accessing the hardware driver library within the wristwatch apparatus, and generating the control signal based on an API of a second mechanical display indicator hardware driver in the hardware driver library to cause the mechanical movement of the second mechanical display indicator according to the information extracted from the received FM signal;

a display for mechanically displaying the information extracted by the processor, wherein the display includes the first mechanical display indicator and the second mechanical display indicator, wherein the first mechanical display indicator includes the icon that indicates the selected available public FM channel, wherein the second mechanical display indicator includes the information in the context of the icon that mechanically indicates the selected available public FM channel; and a power supply for providing power to the system.

* * * * *